(12) United States Patent
Hartness et al.

(10) Patent No.: US 7,021,453 B2
(45) Date of Patent: Apr. 4, 2006

(54) CONVEYOR WITH GEAR MECHANISM GRIPPER AND RELATED CONVEYOR LINK

(75) Inventors: Thomas P. Hartness, Greenville, SC (US); William R. Hartness, III, Greenville, SC (US); Mark W. Davidson, Greer, SC (US); Frank Brennan, Greenville, SC (US); Robert C. Beesley, Greenville, SC (US)

(73) Assignee: Hartness International, Inc., Greenville, SC (US)

(*) Notice: Subject to any disclaimer, the term of this patent is extended or adjusted under 35 U.S.C. 154(b) by 120 days.

(21) Appl. No.: 10/712,405

(22) Filed: Nov. 13, 2003

(65) Prior Publication Data

US 2005/0103599 A1   May 19, 2005

(51) Int. Cl.
   *B65G 17/06* (2006.01)

(52) U.S. Cl. ............... 198/697; 198/699.1; 198/476.1; 198/479.1; 198/480.1; 198/803.7; 198/803.9; 198/844.1; 198/850

(58) Field of Classification Search ........... 198/370.02–370.04, 198/198/198/198/198/ 198/476.1, 479.1–481, 697, 699.1, 803.7, 198/803.9, 844.1, 850
   See application file for complete search history.

(56) References Cited

U.S. PATENT DOCUMENTS

| | | | |
|---|---|---|---|
| 1,073,067 A | | 9/1913 | Ayars |
| 1,883,007 A | | 5/1930 | Sheel |
| 1,892,463 A | | 12/1932 | Gray |
| 2,258,717 A | * | 10/1941 | Read ................. 198/803.7 |
| 2,766,635 A | | 10/1954 | Schwarzkopf |

(Continued)

FOREIGN PATENT DOCUMENTS

| | | |
|---|---|---|
| DE | 2153078 | 10/1971 |
| DE | 19 637624 A1 | 3/1998 |
| EP | 0366067 A1 | 5/1990 |

(Continued)

OTHER PUBLICATIONS

U.S. Pat. Appl. No. 2001/0013459 filed Aug. 2001.
U.S. Pat. Appl. No. 2002/0011400 filed Jan. 2002.
U.S. Pat. Appl. No. 2002/0060132 filed May 2002.
U.S. Pat. Appl. No. 2002/0079199 filed Jul. 2002.
U.S. Pat. Appl. No. 2002/0139645 filed Oct. 2002.
U.S. Pat. Appl. No. 2002/0144880 filed Oct. 2002.
U.S. Pat. Appl. No. 2003/0047427 filed Mar. 2003.
U.S. Pat. Appl. No. 2003/0029700 filed Feb. 2003.

(Continued)

*Primary Examiner*—Eileen D. Lillis
*Assistant Examiner*—Mark A. Deuble
(74) *Attorney, Agent, or Firm*—Dority & Manning, P.A.

(57) ABSTRACT

Various conveyor designs are disclosed, along with related link designs, suitable for conveying objects along a transport direction. The conveyor may include a plurality of connected links. Each link may have a length extending across the direction of transport and a width extending along the direction of transport. Each link may have a body, a slider, at least one gripping member, and a gear drive mechanism interconnecting the slider and gripping member. The slider is slidable along the length of the body to selectively move the gripping member between a first position and a second position via the gear drive mechanism. The gripping member when in first position is disposed in an open position, and the gripping member when in the second position is disposed in a gripping position for contacting one of the objects to hold the object during transport. The gear drive mechanism may be a rack and pinion mechanism, the gripping member may have one or more gripping arms, and the gripping arms may or may not be offset from the gear drive mechanism.

62 Claims, 22 Drawing Sheets

U.S. PATENT DOCUMENTS

| | | | |
|---|---|---|---|
| 3,168,123 A | 1/1962 | Pellerino et al. | |
| 3,067,863 A | 12/1962 | Schwinger | |
| 3,125,370 A | 3/1964 | McGill | |
| 3,308,928 A | 3/1967 | Mosterd | |
| 3,590,982 A | 7/1971 | Banyas | |
| 3,608,700 A | 9/1971 | Nilsson | |
| 3,664,491 A | 5/1972 | Scanlon et al. | |
| 3,703,954 A | 11/1972 | Gudmestad | |
| 3,754,637 A | 8/1973 | Carter et al. | |
| 3,777,877 A | 12/1973 | Piper | |
| 3,794,315 A * | 2/1974 | Kaneko et al. | 269/56 |
| 3,854,574 A | 12/1974 | Theijsmeijer et al. | |
| 3,860,104 A | 1/1975 | Strauss | |
| 3,881,592 A | 5/1975 | Stimpson | |
| 3,910,404 A | 10/1975 | Henrekson | |
| 3,944,058 A * | 3/1976 | Strauss | 198/377.07 |
| 3,949,859 A | 4/1976 | Nussbaumer et al. | |
| 4,018,325 A | 4/1977 | Rejsa | |
| 4,068,882 A | 1/1978 | Van der Schoot | |
| 4,159,762 A | 7/1979 | Bulwith | |
| 4,171,738 A | 10/1979 | Lieberman | |
| 4,172,514 A | 10/1979 | Schantz et al. | |
| 4,183,428 A | 1/1980 | McGill et al. | |
| 4,291,733 A | 9/1981 | Polderman | |
| 4,502,587 A | 3/1985 | Clark | |
| 4,513,858 A | 4/1985 | Fellner et al. | |
| 4,524,865 A | 6/1985 | von Hofen | |
| 4,530,433 A * | 7/1985 | Cucchetto | 198/803.7 |
| 4,533,038 A | 8/1985 | Richard | |
| 4,638,906 A | 1/1987 | Winiasz | |
| 4,678,077 A | 7/1987 | Bertorello | |
| 4,745,007 A | 5/1988 | Houseman | |
| 4,790,421 A | 12/1988 | Gorges | |
| 4,793,261 A | 12/1988 | Schwaemmle | |
| 4,807,421 A | 2/1989 | Araki et al. | |
| 4,817,780 A | 4/1989 | Davidsson | |
| 4,823,934 A | 4/1989 | Lemaire et al. | |
| 4,835,946 A | 6/1989 | Hartness et al. | |
| 4,856,144 A | 8/1989 | de Greef | |
| 4,878,577 A | 11/1989 | Romero Lledo et al. | |
| 4,901,844 A | 2/1990 | Palmaer et al. | |
| 4,921,294 A | 5/1990 | Klopfenstein | |
| 4,925,013 A | 5/1990 | Lapeyre | |
| 4,934,517 A | 6/1990 | Lapeyre | |
| 4,953,687 A | 9/1990 | Gazzarrini | |
| 5,004,097 A | 4/1991 | Roinestad et al. | |
| 5,072,573 A | 12/1991 | Tisma | |
| 5,115,901 A | 5/1992 | Santandrea et al. | |
| 5,127,514 A | 7/1992 | Guttinger et al. | |
| 5,219,065 A | 6/1993 | Hodlewsky et al. | |
| 5,285,884 A | 2/1994 | Polling et al. | |
| 5,392,896 A | 2/1995 | Martelli | |
| 5,395,151 A | 3/1995 | Eberle | |
| 5,400,894 A | 3/1995 | Smith | |
| 5,427,227 A | 6/1995 | Crandall et al. | |
| 5,429,227 A | 7/1995 | Krossmann et al. | |
| 5,497,887 A | 3/1996 | Hiebert | |
| 5,509,524 A | 4/1996 | Ohmori et al. | |
| 5,603,399 A | 2/1997 | Mannlein | |
| 5,611,418 A | 3/1997 | Helmstetter | |
| 5,620,084 A | 4/1997 | Mensch | |
| 5,697,490 A | 12/1997 | Raque | |
| 5,722,655 A | 3/1998 | Reist | |
| 5,791,453 A | 8/1998 | Schmits et al. | |
| 5,890,584 A * | 4/1999 | Bonnet | 198/867.15 |
| 5,915,524 A | 6/1999 | Horlacher | |
| 5,927,504 A | 7/1999 | Han et al. | |
| 5,931,282 A | 8/1999 | Maruyama et al. | |
| 5,947,262 A | 9/1999 | Boring et al. | |
| 5,960,927 A | 10/1999 | Bahr | |
| 6,029,797 A | 2/2000 | Olsson | |
| 6,062,799 A | 5/2000 | Han et al. | |
| 6,079,541 A | 6/2000 | Bercelli et al. | |
| 6,112,885 A | 9/2000 | Kuster et al. | |
| 6,119,848 A | 9/2000 | Hartness, III et al. | |
| 6,182,819 B1 | 2/2001 | Rehm | |
| 6,186,314 B1 | 2/2001 | Conklin, Jr. | |
| 6,209,716 B1 | 4/2001 | Bogle et al. | |
| 6,234,300 B1 | 5/2001 | De Vos et al. | |
| 6,237,750 B1 | 5/2001 | Damkjaer et al. | |
| 6,321,897 B1 | 11/2001 | Cassoni et al. | |
| 6,334,526 B1 | 1/2002 | Hatton | |
| 6,343,690 B1 | 2/2002 | Britton et al. | |
| 6,374,997 B1 | 4/2002 | Spadafora et al. | |
| 6,474,464 B1 | 11/2002 | Horton et al. | |
| 6,494,238 B1 | 12/2002 | Sindermann | |
| 6,494,307 B1 | 12/2002 | Kozak et al. | |
| 6,533,103 B1 | 3/2003 | Hartness et al. | |
| 6,533,126 B1 | 3/2003 | Parsons | |
| 6,601,697 B1 * | 8/2003 | Steeber et al. | 198/844.1 |
| 6,612,095 B1 | 9/2003 | Hartness | |
| 6,619,472 B1 | 9/2003 | Rehm | |
| 6,675,951 B1 | 1/2004 | Preti | |
| 6,684,602 B1 | 2/2004 | Reinecke | |
| 6,692,050 B1 | 2/2004 | Graffin | |
| 6,742,647 B1 | 6/2004 | De Greef | |
| 6,748,983 B1 | 6/2004 | Bausch | |
| 6,761,264 B1 | 7/2004 | Steeber et al. | |

FOREIGN PATENT DOCUMENTS

| | | |
|---|---|---|
| EP | 0471401 A2 | 2/1992 |
| EP | 1061014 A1 | 12/2000 |
| EP | 11886922 A2 | 3/2002 |
| FR | 1195550 | 11/1959 |
| GB | 513260 | 10/1939 |
| GB | 1264622 | 2/1972 |
| JP | 5785714 | 5/1982 |
| JP | 57209104 | 12/1982 |
| JP | S6087111 | 5/1985 |
| JP | 7206123 | 8/1995 |
| JP | 8120966 | 5/1996 |
| JP | 20-02249215 | 9/2002 |
| MC | 35162328 | 5/1962 |
| WO | WO 51919 A | 8/2000 |
| WO | WO 02/092240 A1 | 11/2002 |

OTHER PUBLICATIONS

U.S. Pat. Appl. No. 2003/0173186 filed Sep. 2003.
Posimat Universal Puck Sreen Shot Jul. 19, 2004.
U.S. Patent Appl. No. 2003/0037514, filed Feb. 27, 2003.
U.S. Patent Appl. No. 2001/0027825, filed Oct. 11, 2001.
U.S. Patent Appl. No. 2004/151842, filed Aug. 15, 2004.
Patent Abstracts of Japan JP 2002249215, filed Sep. 3, 2002.
Patent Abstracts of Japan JP2000255736, filed Sep. 19, 2000.
Patent Abstracts of Japan JP57085714, filed May 28, 1982.
Int'l Search Report and Written Opininon for PCT/US2004/037234.
Translation of Pub. WO/51919 filed Sep. 2000.
Patent Abstracts of Japan JP08120966A, filed May 14, 1996.
Patent Abstracts of Japan JP07206123, filed Aug. 8, 1995.
Patent Abstracts of Japan JP57209104, filed Dec. 22, 1982.

* cited by examiner

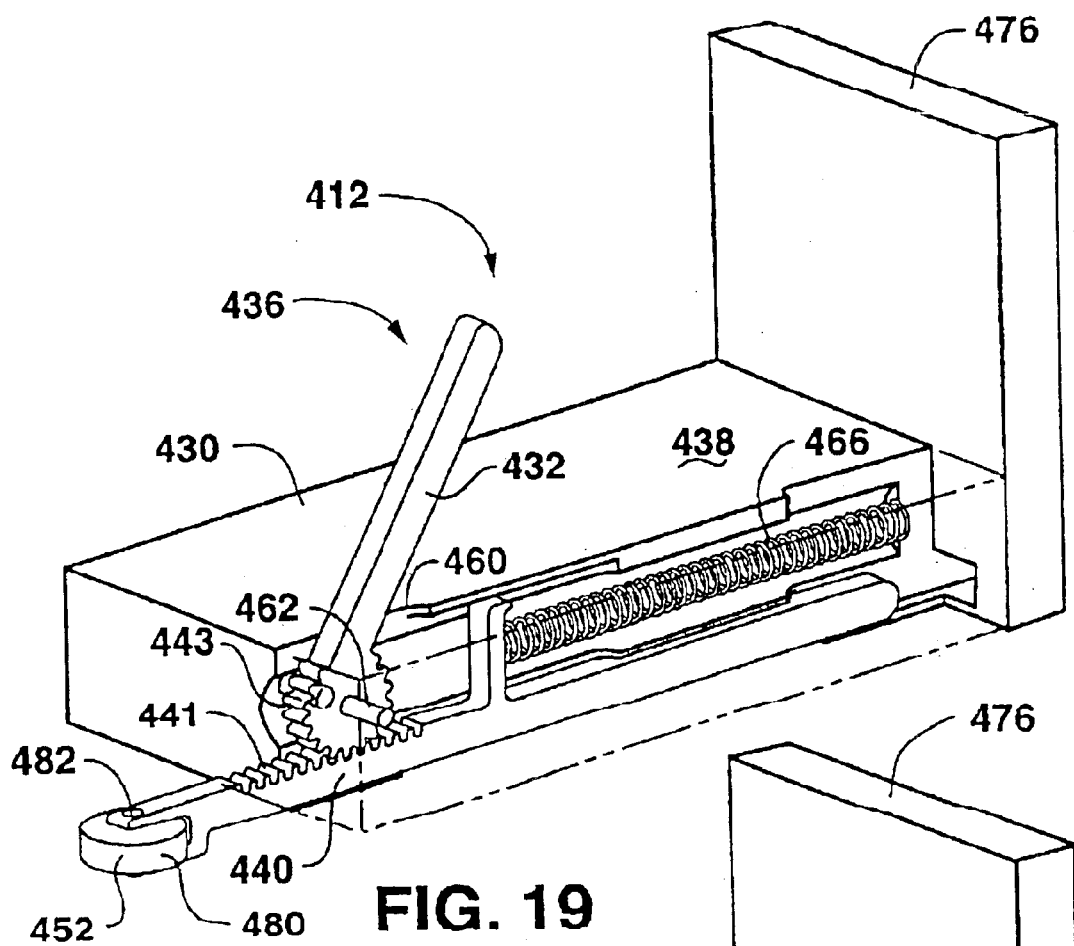
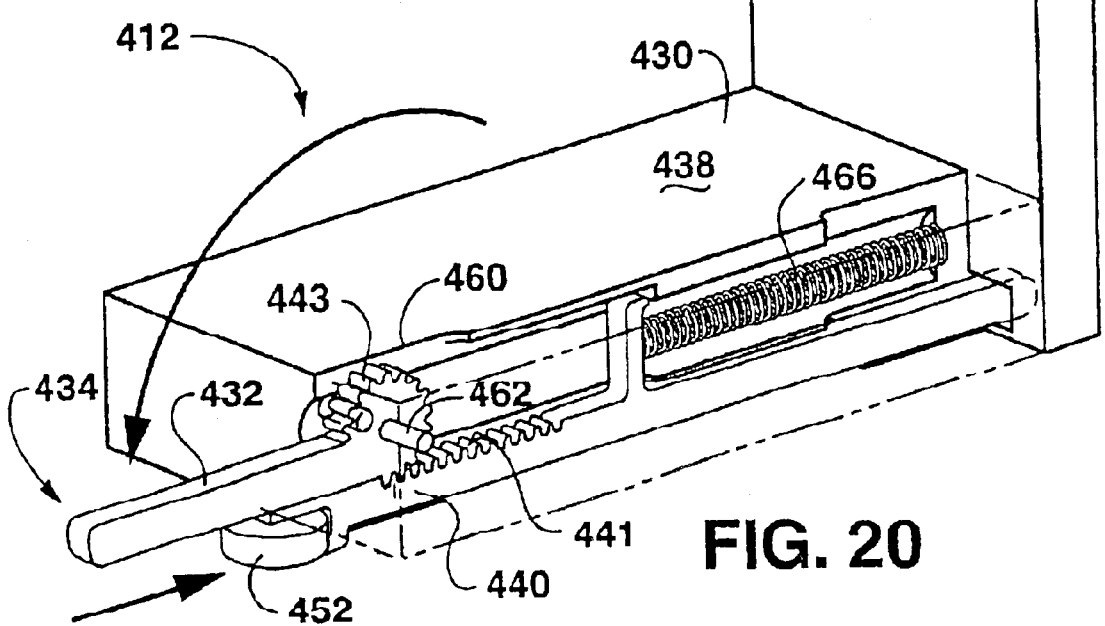

CONVEYOR WITH GEAR MECHANISM GRIPPER AND RELATED CONVEYOR LINK

RELATED APPLICATIONS

The present application is related to U.S. patent application Ser. Nos. 10/712,406 and 10/712,407 (pending), respectively entitled Gripper Conveyor with Clear Conveying Path and Related Conveyor Link, and Conveyor with Movable Gripper and Related Conveyor Link, filed on even date herewith and owned by assignee of the present application.

FIELD OF THE INVENTION

The present invention relates generally to a conveyor and a link for such a conveyor including at least one gripping member on a given link for gripping objects such as containers. More particularly, the invention relates to gripper conveyors and links that include gripping members that slide, pivot, or otherwise move into a gripping position.

BACKGROUND OF THE INVENTION

Various types of conveyors have been utilized for conveying objects in industrial production lines. Objects may be conveyed from work station to work station individually or in groupings, depending on the object and the task to be performed. It may or may not be important to maintain any spacing or control of the objects during some or all of the travel. For example, apples being conveyed may simply be stacked randomly on a conveyor, while bottles being filled may be held rigidly in place by a filling machine that has received the bottles from a conveyor.

Certain conveyor belts (sometimes also called chains) are made of a plurality of interconnected links, driven by motors that engage the conveyor belt. Such conveying systems are commonly employed in the transportation of manufactured goods and articles, and for containers. With these typical systems, the motor drives a toothed drive sprocket that engages complimenting driving recesses or "dogs" formed on the conveyor belt. These drive units can be disposed in any number along the length of the conveyor belt. Such a drive unit and conveyor system is disclosed in U.S. Pat. No. 6,119,848 which is assigned to the assignee of the present invention, and is incorporated herein by reference in its entirety for all purposes.

Link type conveyor belts are sometimes designed having a knuckle/socket joint arrangement wherein one part of the link has a rounded knuckle and the opposite part has a socket formed by two extending edges. The knuckle of one link fits into the socket of a neighboring link. The knuckle is able to move in various directions within the socket, which allows for the conveyor system as a whole to curve and move.

The interconnected links typically have a platform member connected to or formed integral with the link's upper (conveying) surface. The platform member is generally shaped to match the neighboring platform members on other links such that the links can turn in a plane or twist while moving around curved sections of the conveying system, yet are also shaped such that the cracks and spaces formed between the links are minimized. The platform members can be connected to the links in several different ways. For instance, the platforms may have pegs extending therefrom which match corresponding slots on the links. Alternatively or additionally, the platforms can have snap springs which lock into place on corresponding sections of the links. Such a knuckle link with a platform surface member is disclosed in U.S. Pat. No. 6,209,716 which is owned by the assignee of the present invention and incorporated herein by reference in its entirety for all purposes.

Often times, it is the case that objects move or shift locations on the conveyor belt during transportation. This can be due to vibrations in the operation of the conveying system, centrifugal or tangential forces on the object when the conveying belt enters a curved section, or from simply being hit by other objects placed onto the conveyor belt. One way to prevent objects from moving on the surface of a conveyor belt is to apply a high friction surface element which keeps the objects in place. Such a technique is taught in U.S. Pat. No. 4,925,013 which is incorporated herein by reference in its entirety for all purposes.

Although the application of a friction surface element will minimize the aforementioned problems associated with the transport of goods, it may also create side-effect problems. For instance, an object placed on a high friction surface element will not move to a desired spot on the conveyor belt unless some other mechanical force is provided in which to move the object. Often times it is desired to specifically locate an object on a conveyor belt, and this cannot be accomplished if the object on a high friction surface is not initially placed in the desired location.

Further, it can also be the case in a particular application that a frictional or a high frictional surface is disfavored. This would be true if heavy objects were to be removed from the conveyor belt by use of a bar or other means to slide the objects off the belt. Having a heavy object on a high friction surface would necessitate the need to generate increased amounts of force to move the object from the conveyor belt, or would at least impede movement of the object from the belt. Additionally, it could be the case that a particular application requires the object to be positioned at a particular location on the conveyor belt surface. Having a frictional surface would again prevent or impede the movement of the object from one location on the surface platform of the conveyor belt to another.

Another problem associated with some conveyor systems is vibration which causes objects to be rotated from one orientation to another. Ways used in the prior art to prevent this include adding guide rails to either side of the conveyor track to keep the object in place. These guide rails are stationary with respect to the moving conveyor track. Although effective, this solution can be impractical in certain parts of the conveying system in which spatial constraints do not allow for the installation of guide rails.

One solution for securely conveying objects is a conveyor system where the conveying surface is sloped and a fixed rail is provided at the bottom of the slope on the platform member, as is disclosed in U.S. Pat. No. 6,601,697, which is owned by the assignee of the present invention and incorporated herein by reference in its entirety for all purposes. This arrangement works well to hold certain types of conveyed objects in a given position for its intended applications, but the fixed rail and slope could inherently prevent loading or unloading the conveyor in certain orientations. Thus, additional machinery could be required to load and/or unload the conveyor. Further, the conveyor platform members are configured in a given size, so the ability to use the conveyor for different sized containers may require using a different sized platform member.

SUMMARY OF THE INVENTION

It is an objective of the present invention to provide a conveyor and a link for a conveyor that is readily and reliably manufactured, that securely conveys objects, and that is adaptable to various applications. Other objectives and advantages of the present invention will be set forth in part in the following description, or may be obvious from the description, or may be learned from practice of the invention.

According to one aspect of the invention, a conveyor is disclosed suitable for conveying objects along a transport direction. The conveyor includes a plurality of connected links, each link having a length extending across the direction of transport and a width extending along the direction of transport. Each link has a body, a slider, at least one gripping member, and a gear drive mechanism interconnecting the slider and gripping member. The slider is slidable along the length of the body to selectively move the gripping member between a first position and a second position via the gear drive mechanism. The gripping member when in first position is disposed in an open position, and the gripping member when in the second position is disposed in a gripping position for contacting one of the objects to hold the object during transport.

The gear drive mechanism may be a rack and pinion arrangement with a pinion portion being located on the gripping member and a rack portion being located on the slider. Each link may include a spring member for urging the gripping member toward one of the first or second positions. Each link may include a cam follower, and the cam follower may contact a cam to thereby urge the gripper toward one of the first or second positions.

Each link may include a fence member, the gripping member gripping the object between the fence member and the gripping member when the gripping member is in the second position. The link body may define a conveying surface, and the gripping member and fence member may be configured to grip the object so that the object is spaced from the conveying surface. Also, the gripping member and the fence member may be configured to grip and convey an object in an inverted position with the object located substantially below the links and/or the gripping member and the fence member may be configured to grip a container neck. The gripping member may also include an adapter sized to fit the object. The second position may be self-adjustable depending on the size of the object.

Each gripping member may pivot relative to its respective link when moving from the first position to the second position, and each gripping member may pivot about an axis substantially parallel to the direction of transport when moving from the first position to the second position. Each link may include a spring member, and each gripping member may be urged toward the second position by the spring member. The conveyor may include a first and/or second cam member for urging the gripping members toward the first and/or second position.

Each link may include at least one cam follower for contacting at least one cam member to move the gripping member, and the cam follower may be mounted on the slider.

The gripping member may include two gripping arms movable relative to the conveying surface. The gripping member may have at least one gripping arm laterally offset from the gear drive mechanism in the direction of transport. The conveyor may be configured so that conveyed objects can be removed from the gripping members when the gripping members are in the second gripping position.

According to another aspect of the invention, a link for a conveyor is disclosed suitable for conveying objects along a transport direction. The link includes a link body having a length extending across the direction of transport and a width extending along the direction of transport. A slider is slidable along the length of the link body, and at least one gripping member is movable relative to the slider and link body. A gear drive mechanism interconnects the slider and gripping member, the slider selectively moving the gripping member between a first position and a second position via the gear drive mechanism. The gripping member when in first position is disposed in an open position, and the gripping member when in the second position is disposed in a gripping position for contacting one of the objects to hold the object during transport. Various other options and applications are possible, as above. The link may be for a new conveyor, for replacement, or for retrofit.

According to another aspect of the invention, a link for a conveyor is disclosed suitable for conveying objects along a transport direction. The link includes a link body having a length extending across the direction of transport and a width extending along the direction of transport. A slider is slidable along the length of the link body. At least one gripping member is movable relative to the slider and link body, the gripping member having at least one gripping arm. A rack and pinion gear drive mechanism interconnects the slider and gripping member. The gripping arm is laterally offset from the gear drive mechanism in the direction of transport. A pinion portion is located on the gripping member and a rack portion is located on the slider. The slider selectively moves the gripping member between a first position and a second position via the gear drive mechanism. The gripping member when in first position is disposed in an open position, and the gripping member when in the second position is disposed in a gripping position for contacting one of the objects to hold the object during transport. Various other options and applications are possible, as above.

BRIEF DESCRIPTION OF THE DRAWINGS

FIG. 19 is a partial cutaway view of another conveyor link embodiment according to the present invention and including a rack and pinion drive for the gripping member in a gripping position;

FIG. 20 is a partial cutaway view of the conveyor link of FIG. 19 in an opened position;

DETAILED DESCRIPTION OF THE PREFERRED EMBODIMENTS

Figure 1:
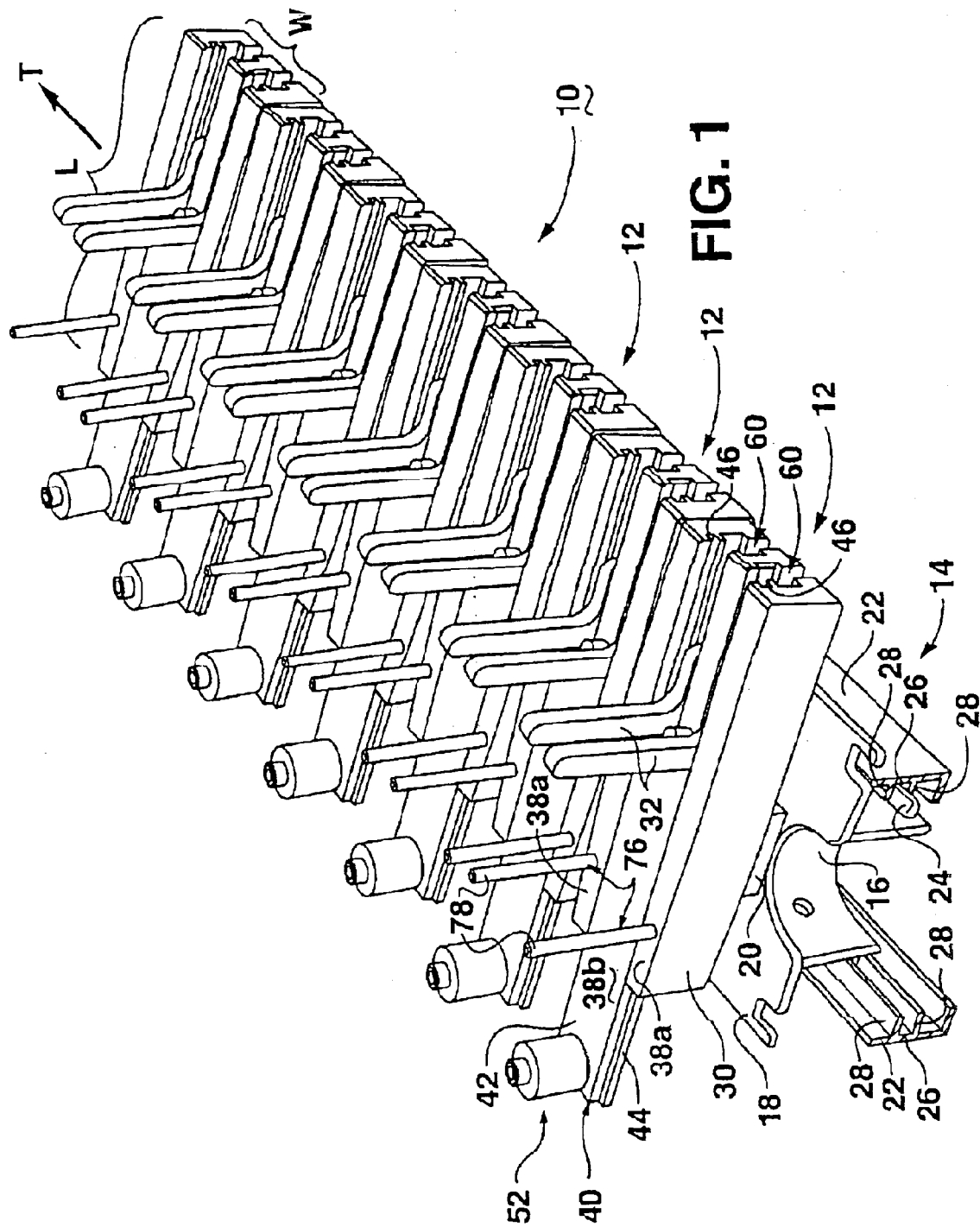
FIG. 1 is a perspective view of one embodiment of the invention showing a conveyor having links with gripping members attached to a knuckle drive and platform members.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment It is intended that the present invention include these and other modifications and variations. In discussing various embodiments, like or similar reference numerals are used below with like or similar parts of various embodiments.

As shown in the various figures, numerous embodiments of a gripper conveyor and conveyor link with a gripping member are disclosed. It should be understood that the present invention encompasses both a gripper conveyor chain-type structure, and individual links for such a chain. It should also be understood that various different methods of attaching such links together into a conveyor belt or chain to be driven are possible. The examples shown herein are for explanatory purposes only, and are not intended to limit the invention only to that shown and disclosed.

With particular reference to FIGS. 1–8, a first embodiment of a gripper conveyor and conveyor link are shown. According to this embodiment of the invention, a conveyor 10 includes a plurality of links 12 and a drive mechanism 14. As illustrated in FIG. 1, drive mechanism 14 includes a knuckle conveyor 16 attached to a platform member 18, which may be constructed as set forth in U.S. Pat. No. 6,601,697 or in various other ways. It should be understood that drive mechanism 14 can have many shapes and forms according to the present invention. For example, instead of knuckle conveyor 16, other types of conveyors, belts, or chains such as roller chains, or roller chains with attachments, could be used for drive mechanism 14.

In the example shown, knuckle conveyor 16 is driven within rails 22, and is guided by flanges 24 extending from knuckle conveyor 16 into channels 26 defined by walls 28 of rails 22. As is known in the art, the drive mechanism may traverse a straight or curved line from one end of a production line to the other, or from station to station within a production line. There should be no limitation placed on the type or arrangement of drive mechanism 14, according to the present invention.

As shown, links 12 may be attached to platform members 18 via intermediate attachment members 20, which may include blocks, screws, rivets, etc. Accordingly, there should also be no limitation implied as to the method of attaching links 12 to drive mechanism 14. Furthermore, links 12 could be formed integral with parts of drive mechanism 14, rather than attached to it as shown in FIG. 1. Links 12 may taper slightly to become narrower at their ends, as shown, to facilitate moving the conveyor around curved paths.

As shown in FIG. 1, each of the individual links 12 is identical to the others. Although such arrangement is a preferred embodiment, such arrangement is not required according to the scope of the present invention. Therefore, a conveyor according to the present invention could include a plurality of connected links, but the links need not all be identical, and there may be spacers, pivots, connection members, etc. located between certain of the links to suit various applications. All such subject matter should therefore be considered within the scope of the present invention.

Figure 2:
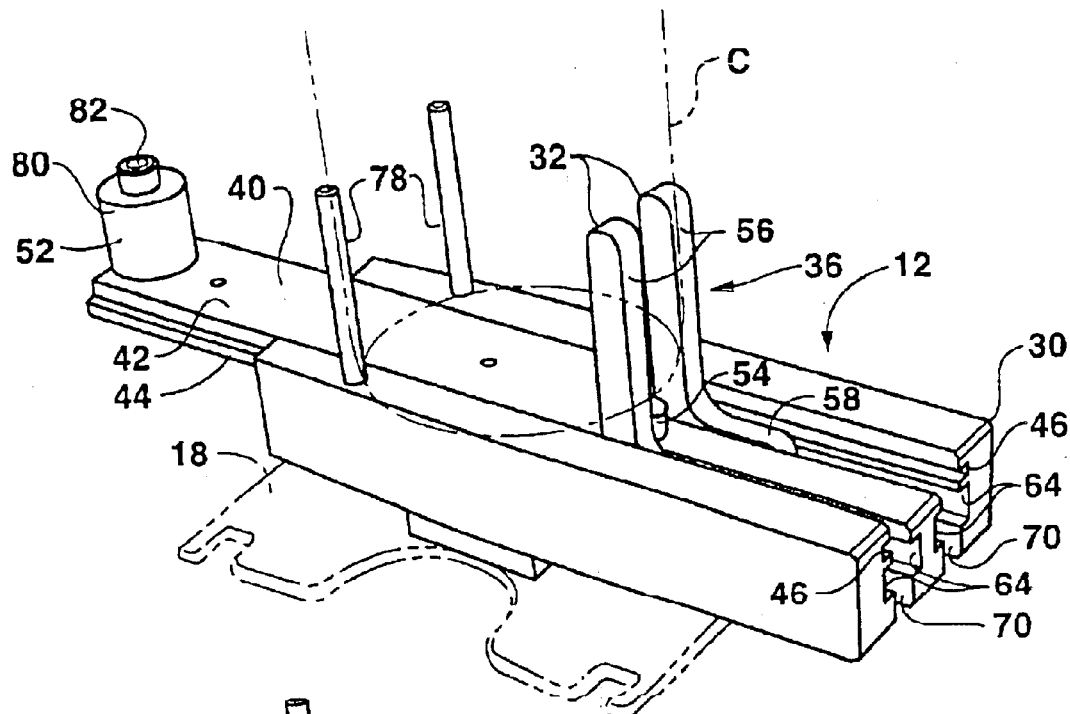
FIG. 2 is a perspective view of a single link of the conveyor of FIG. 1 with the gripping members disposed in a gripping position.
Figure 3:
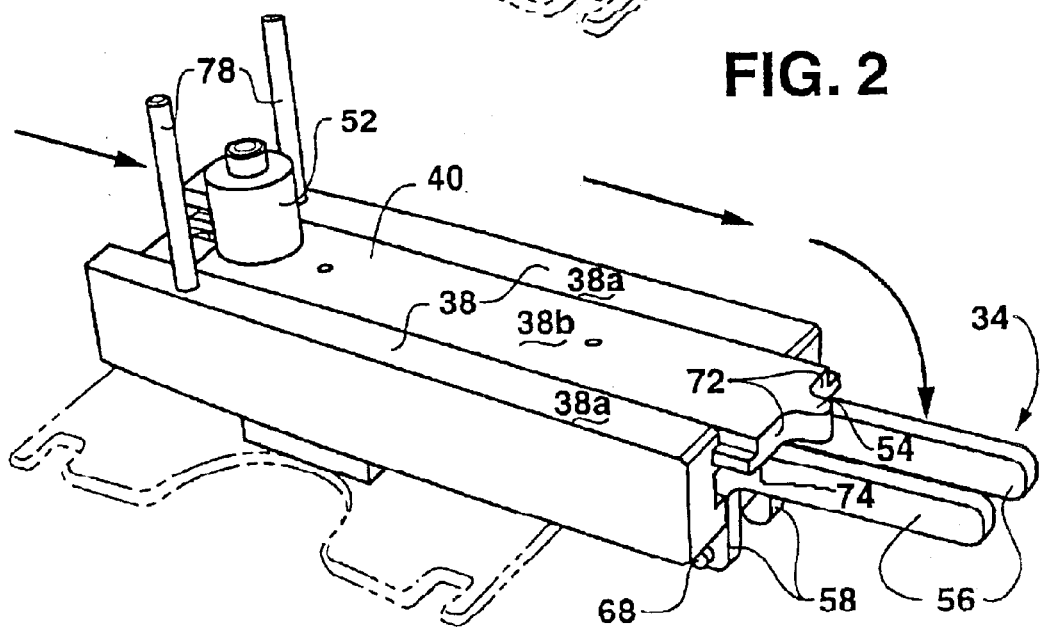
FIG. 3 is a perspective view of a link as in FIG. 2, with the gripping members disposed in an opened position.
Figure 4:
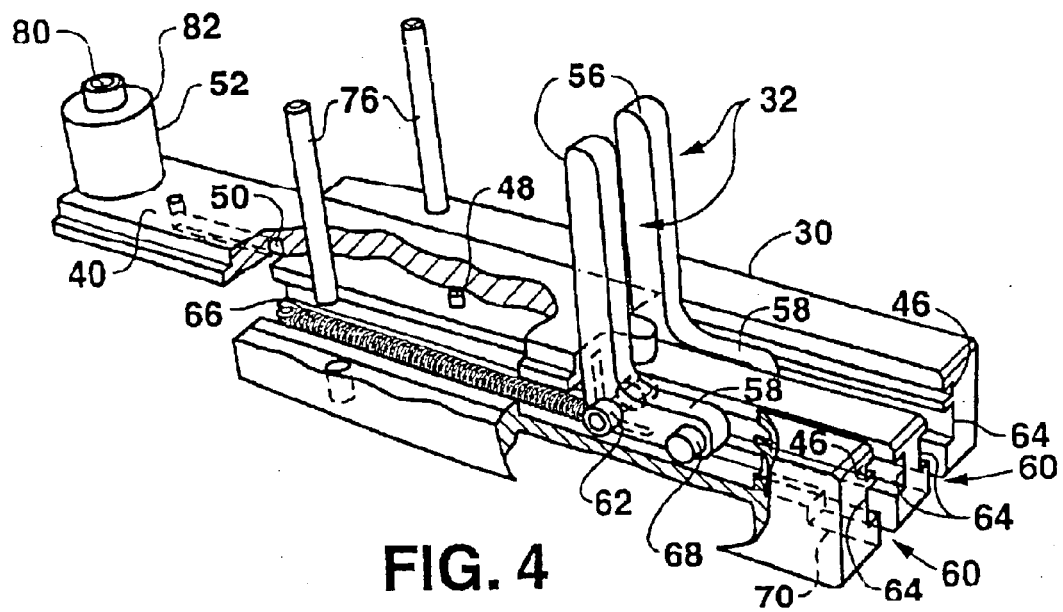
FIG. 4 is a partial cutaway view of the link of FIG. 2.

Turning now to the individual links, with particular reference to FIGS. 2–4, each link 12 includes a body 30. For purposes of reference herein, links 12 can be said to be arranged along a direction of transport T, and each link 12 has a length L extending across the direction of transport and a width W extending along the direction of transport (see FIG. 1). According to this embodiment of the invention, link 12 has at least one gripping member 32 that is moveable along at least a portion of the length of link 12 from a first position 34 (as shown in FIG. 3) to a second position 36 (as shown in FIG. 2). When gripping members 32 are located in first position 34, gripping members 32 may be disposed below a conveying surface 38 of link 12. When gripping members 32 are located in second position 36, the gripping members are located above conveying surface 38 in a position suitable for contacting an object, such as a container C, during transport.

"Above" and "below" are used to describe the relative position of the gripping members to the link and conveying surface with the link in the orientation shown on FIGS. 2 and 3. If the link were turned upside down, with the link in the position shown in FIG. 3, the gripping members 32 would still be considered relatively beneath the conveying surface 32 for purposes of the present description, even though relative to the ground the gripping members may be located above the conveying surface. Thus, the "above" and "below" terms used herein are relative, not absolute, terms.

Link 12 includes body 30 and a slider 40 configured so as to be slidable along body 30. As shown, slider 40 may include a main body portion 42 and flanges 44 that extend into grooves 46 in body 30. Conveying surface 38 may include portions 38a disposed on body 30 and portion 38b disposed on slider 40. Preferably, conveying surface 38 is substantially continuous across the upper portion of link 12 in the direction of transport T. As discussed below with reference to later embodiments, slider 40 may alternatively be housed entirely within body 30 so that conveying surface 38 is entirely located on body 30. Alternatively, the conveying surface could be configured so as to lie on slider 40.

If desired, a pin 48 extending from body 30 (see FIG. 4) may slide within a groove 50 in slider 40 to align and/or restrict motion of slider 40. As shown, a cam follower 52 is mounted on slider 40 at one end, and a second cam follower 54 is mounted on slider 40 at another end. Cam followers 52, 54 and their locations are optional, and may be subject to various configurations and operations, as will be described below.

Slider 40 functions to position gripping member 32 in various ways. As shown in FIG. 4, each gripping member 32 includes an extending gripping arm 56 and a positioning arm 58. Gripping member 32 may slide and/or pivot relative to body 30 within slots 60 defined in body 30. Slots 60 are particularly shaped so as to allow gripping member 32 to slide, to pivot, or to remain fixed relative to body 30 in various situations. Gripping member 32 includes an axle 62 extending therethrough, that fits within opposed channels 64 of slots 60. Spring members 66 are attached to axle 62 of gripping member 32 at one end and to body 30 at another end so as to urge gripping members 32 toward second position 36, as shown in FIGS. 2 and 4. Spring members 66 may comprise tension coil springs.

Each gripping member 32 may also include a peg 68 extending into one of the channels 64 to help guide the gripping member while sliding across body 30. Peg 68 and axle 62 maintain gripping member in its (as shown in FIG. 4) substantially vertical orientation until peg 68 exits the end of channel 64. Slots 60 also each include a cutout 70 opposite conveying surface 38. Cutouts 70 allow gripping members 32 to pivot from the position shown in FIG. 2 to the position shown in FIG. 3, and back, under the influence of slider 40. Shoulder portions 72 at the end of slider 40 contact gripping members 32, except for when the gripping members are in the first position, as shown in FIG. 3.

As slider 40 moves from the orientation shown in FIG. 2 to that shown in FIG. 3, typically by virtue of a cam contacting cam follower 52 (see FIG. 6), shoulders 72 contact gripping members 32, pushing the gripping members to the right within slots 60. Pegs 68 and axles 62 maintain gripping members 32 in the substantially vertical (as shown) position until pegs 68 exit their respective channels 64. At that point, positioning arm 58 of gripping members 32 will begin to pivot into cutouts 70 of slots 60, essentially pivoting around axles 62. As slider 40 moves further and further to the right, gripping members 32 continue to pivot in (as shown) a clockwise direction until gripping arms 56 extend substantially horizontally. At this point, a bottom surface 74 of slider 40 holds gripping members 32 in first position 34 (see FIG. 3). Pin 48 would then be at an end of groove 50, if such elements were utilized. Friction between bottom surface 74 and gripping arm 56 caused by spring member 66 may be sufficient to hold slider 40 in place, or a cam may be used to contact cam follower 52. Preferably, no such cam is required to maintain such positioning.

Moving slider 40 back to the left (as shown in FIGS. 2 and 3) essentially reverses the process. Once slider 40 has retracted sufficiently, spring members 66 cause gripping members 32 to begin to pivot in a (as shown) counterclockwise direction. Accordingly, positioning arm 58 begins to move out of cutouts 70 and spring members 66 essentially pull pegs 68 back into their respective channels 64. A camming function, or simply spring members 66, may thereafter move slider 40 and gripping members 32 toward second position 36. If pin 48 and groove 50 are utilized, the pin and groove may define second position 36. Alternately, second position 36 may be self-adjustably defined by the size and/or orientation of the object being conveyed, such as container C.

As shown in FIGS. 1–5, links 12 preferably each include a fence 76 of some sort, and gripping members 32 may grip an object such as container C between the gripping members and the fence when the gripping members are in second position 36. As shown best in FIG. 1, fence 76 may comprise a plurality of pins 78. As shown in FIGS. 2 and 3, each body 30 may include two such pins 78. If desired, the location, size, and properties of pins 78 may be adjusted to fit certain applications. For example, the pins may be located at different points along length L, depending upon the size of the object being transported. If desired, body 30 may include a plurality of sets of openings for receiving the pins or could be adjustably locatable via a set screw, so as to make the pins' location adjustable between predetermined positions. As will be described below, fence 76 could comprise various other members, attachments, etc., if desired. Use of separated pins 78 as fence 76 allows slider 40 to move between the pins without obstruction.

Pins 78 should be spaced so that they will hold the object being conveyed as desired with proper orientation and spacing. As gripping members 32 are independently positionable in different locations when gripping a conveyed object, the location of pins 78 will more likely define the location relative to body 30 in which the conveyed object is held. As indicated in FIG. 2, if the object is a substantially cylindrical item such as a bottle, the bottle may be conveyed so that the center is spaced in the middle of slider 40 (along the direction of transport T), and halfway between pins 78. In such situation, if the bottle is cylindrical, gripping members 32 will be substantially adjacent each other while holding the container. However, in a conveyor in which bottles are being conveyed side by side, it is possible that a container's center line may not be aligned with the link's center line. In such situation, gripping members 32 can grip an object in any position between the end of body 30 and the sliding limit of slider 40. Thus, it can be said that gripping members 32 are self-adjustable to suit the size and/or orientation of the conveyed object. If two such gripping members 32 are utilized on a given link 12, the gripping member may, when gripping a round container, not therefore be directly adjacent each other as they may grip different portions around the circumference of a container. Thus, a line of containers may be securely conveyed whether or not they are perfectly aligned and/or spaced along conveyor 10. Adjacent links 12 may be disposed so that gripping members 32 on adjacent links may contact a given object, so as to provide a continuous gripping area. Thus, an object need not be precisely aligned on any single link in order to be securely conveyed. Adjacent links, using the adjacent fence 76 and gripping members 32, may thus securely hold and convey a given object according to the invention, if desired.

In moving from the position shown in FIG. 2 to the position shown in FIG. 3, gripping members 32 first slide and then pivot. In other embodiments discussed below, all within the scope of the invention, gripping members may move by sliding, pivoting, or any combination of relative movement. As shown in FIG. 3, gripping member 32 pivots about an axis substantially parallel to direction of transport T in moving between the first and second positions 34, 36.

Figure 6:
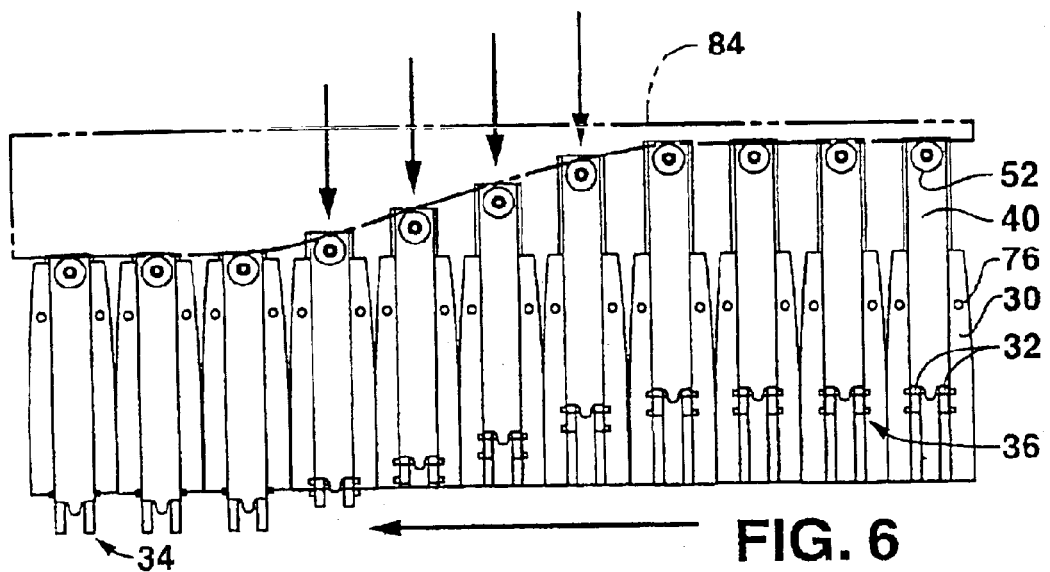
FIG. 6 is a top diagrammatical view showing movement of individual links within the conveyor from a gripping position to an opened position via a cam member.

Turning now to the various possibilities for camming slider 40, slider 40 as shown includes two cam followers 52, 54. Cam follower 52 includes a wheel 80 mounted on a post 82. Cam follower 52 may interact with a cam 84 (FIG. 6) to move slider 40 in a direction to thereby move gripping members 32 from first position 34 (FIG. 3) to second position 36 (FIG. 2). As shown in FIG. 3, when slider 40 is moved all the way in by cam 84, cam follower 52 may be disposed past pins 78 of fence 76. Alternatively, as shown in FIG. 6, cam follower 52 may stay to the outside of pins 78. Either way, in this orientation, friction between bottom surface 74 of slider 40 and gripping members 32 may hold slider 40 in place.

Slider 40 may be moved in the opposite direction in one of several ways. First, an object being conveyed such as a container C may be placed onto body 30 and may contact cam follower 52 (if oriented as in FIG. 3), under the influence of a camming surface, flight bar, etc., and may itself cause the slider to move to the left (as shown in FIG. 3) until such point as gripping members 32 begin to pivot toward the upright position and slide toward second position 36 to thereby contact the object. Thus, in some situations, cam follower 52 may be utilized to move slider 40 in both direction, either under the influence of a cam such as cam 84, or under the influence of the conveyed object such as container C.

Figure 7:
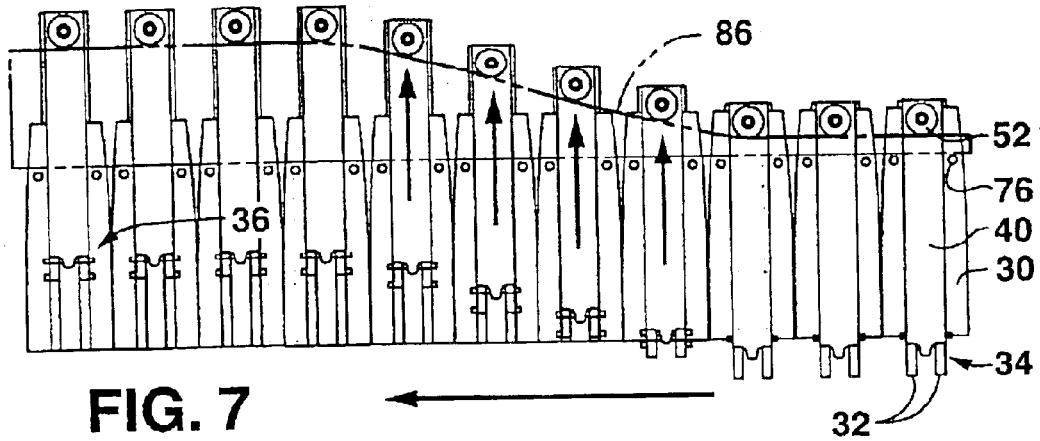
FIG. 7 is a top diagrammatical view showing movement of individual links within the conveyor from an opened position to a gripping position via a cam member.

Alternatively, a second cam 86 may be utilized to move slider 40 back toward the position shown in FIG. 2. As set forth in FIG. 7, such cam 86 simply contacts cam follower 52 and then moves it away from fence 76. As shown in FIGS. 6 and 7, cam follower 52 stays to the outside of fence 76 so as to allow second cam 86 to so operate. It would also be possible to have a cam extend past fence 76, for example from above, and be located to the inside of fence 76.

Figure 8:
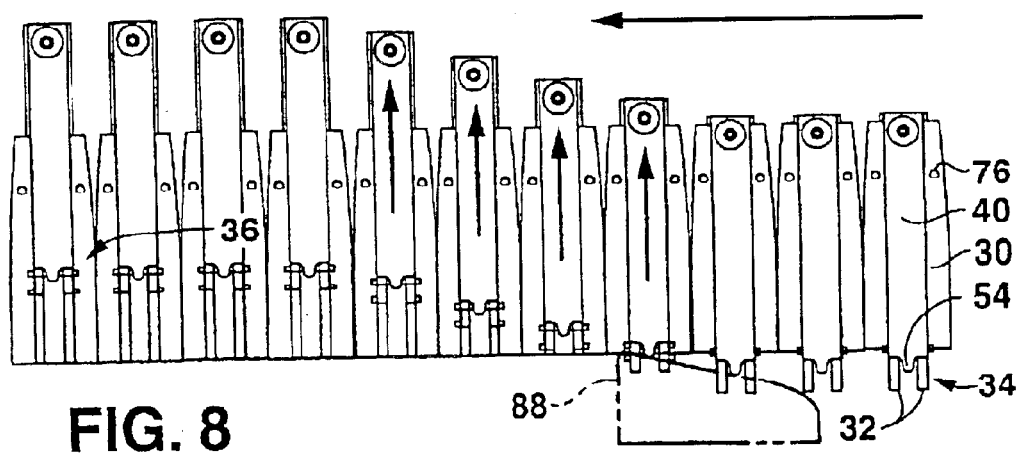
FIG. 8 is a top diagrammatical view showing movement of individual links within the conveyor from an opened position to a gripping position via an alternate cam member.

As another alternative, a third cam 88 is shown in FIG. 8. This cam is a thin cam member that contacts the small cam follower 54 extending from slider 40 (see FIG. 3). Cam member 88 is utilized to move slider 40 past the point where gripping members 32 will begin to pivot under the influence of spring member 66. Cam member 88 may be used where use of a cam such as cam 86 is not possible or desired due to orientation of the conveyor, the size or shape of the objects being conveyed, the location of fence 76 relative to cam follower 52, etc. Thus, numerous options for moving slider 40 between first and second positions 34, 36 utilizing cam followers 52 and/or 54 and cams 84, 86, and/or 88, as well as the conveyed objects themselves, are all possible depending upon the applications desired. It would also be possible in different locations along a line to utilize different combinations of such elements for opening and closing gripping members 32. It should be understood that various possible cam followers on or connected to slider 40 or gripping members 32 are possible. For instance, cam followers may be disposed on a bottom surface of slider 40, thus avoiding fence 76. All such alternatives are within the scope of the present invention.

Figure 5:
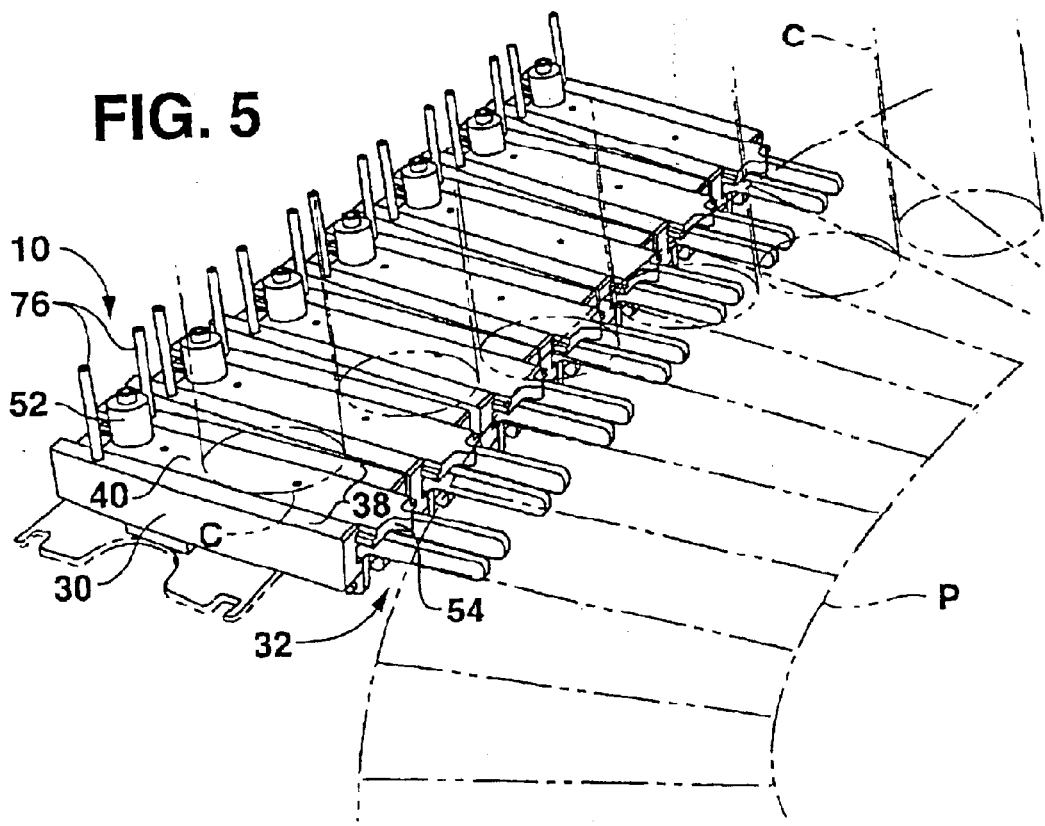
FIG. 5 is a perspective view of the conveyor of FIG. 1 showing an orientation where objects may be slid laterally on or off the conveyor to an adjacent conveyor or platform.

As shown in FIG. 5, one of the benefits of having gripping members 32 disposed below conveying surface 38 when gripping members 32 are in first position 34, is that conveyor 10 may be loaded or unloaded at least partially laterally in a simple, sliding motion. Thus, an adjacent platform or conveyor, generally designated as P in FIG. 5, may be provided adjacent conveyor 10, and objects being conveyed may simply be slid sideways (or diagonally, taking into account motion of the conveyors) onto or off conveyor 10 without use of complicated equipment. The containers need not be gripped and placed, placed in pucks, or otherwise handled as has been done in the past, in order to achieve an orderly and secure row of objects along conveyor 10. Also, it is simpler to achieve a row of objects, such as containers with centers aligned utilizing such a conveyor 10. Further, once gripped by conveyor 10, objects such as containers may be moved throughout a length of production line, may be inverted, etc. at a high rate of speed, while the containers are securely held with centers aligned. Also, objects such as containers gripped in such a way along conveyor 10 may inherently be much quieter than in prior art devices where conveyed containers are more loosely conveyed, or are conveyed between fixed rails that do not move along with the conveyor or between non-gripping side walls of a conveyor. Thus, several potential advantages are provided by the disclosed structure.

It should be understood that still other modifications are possible. For example, it is possible the objects could be vertically or horizontally removed from the links without retracting the gripping members 32 at all. Thus, the gripping members 32 may be in the second gripping position 36 of FIG. 2 when objects are lifted out. A lifting force would have to overcome the force of any spring member 66 or cam holding the gripping members 32 against the object to remove the object in such situation. Various benefits of gripped conveying would still be achieved in such operation.

Also, it could be possible to vertically or horizontally load the links while the gripping members are in the second gripping position 36. Such loading or unloading might require additional machinery to place or remove the objects so as to reliably locate the objects and overcome spring forces, but such operations are a possibility with the present invention.

The spring force of spring members 66 and the design of links 12 in general may be such that the conveyor may be used to carry inverted objects (i.e., objects may "hang" from the conveyor below the conveying surface). The conveyor may achieve such inversion by twisting in a corkscrew fashion or by rotating around a turning wheel or the like. In such case, the conveying surface would be disposed above the objects while the conveyor is inverted, and the preceding discussion of retraction of the gripping member to a position a position "below" the conveying surface would be reversed so as to place the gripping member "above" the conveying surface. Additionally, it would be possible to load and unload conveyors according to the present invention in such an "inverted" orientation using the disclosed embodiments with the gripping members partially or fully retracted.

Links 12 may be made of various different types of materials within the scope of the invention, and depending upon the intended application. For example, body 30, slider 40, and gripping members 32 may be made of a plastic such as Super Tough nylon, available from DuPont, delrin, acetel, Norel™, available from General Electric, pins 78 may be made of a metal such as stainless steel or any other suitable metal, or a plastic such as the above, although other materials could be used within the scope of the invention, depending upon the application, durability, cost, etc. If desired, links 12 may be designed so that different parts are individually replaceable if they are in some way damaged or become worn. Thus, body 30 may be removable and replaceable from drive mechanism 14. Also, a conveyor could be created by retrofitting an existing drive mechanism of some sort with a plurality of links 12. Thus, the present invention includes individual links, as well as a conveyor including such links for some or all of the conveyor, both as original manufacture, for retrofit, or for replacement.

Figure 9:
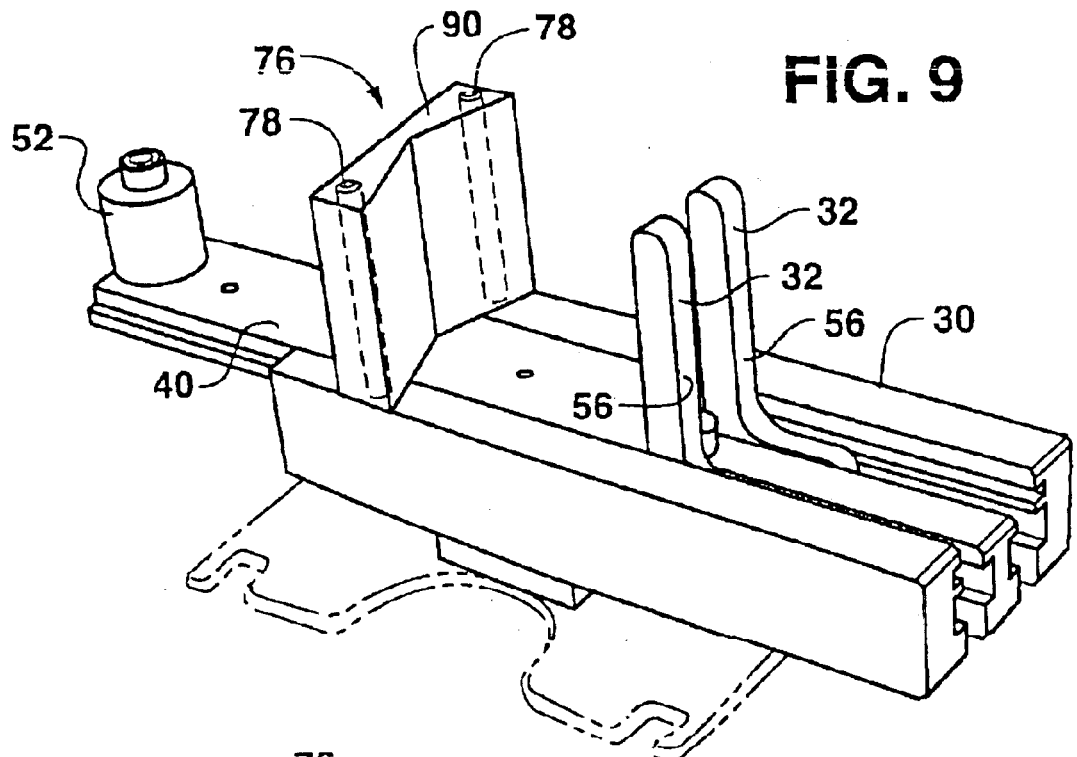
FIG. 9 is a perspective view of an alternate embodiment of a conveyor link having a fixed wall fence member.

Variations in certain of the disclosed elements are shown in FIGS. 9–12. As shown in FIG. 9, fence 76 includes pins 78, as well as an optional adapter 90 mounted on pins 78. As shown, adapter 90 may have a slight flat trough shape so as to guide a conveyed object such as a container to be centered atop link 12. Such adapter 90, as well as such design of link 12 may be useful in situations where it is desired to have one link per object with even spacing of objects on each link. In such application, the width and spacing of adjacent links can be selected so as to achieve reliable orientation of spacing of conveyed objects. Adapter 90 should be high enough to reliably secure the conveyed object when gripping members 32 grip the object. It should be noted that with the design of FIG. 9, cam follower 52 cannot pass any further than the location of adapter 90.

Figure 10:
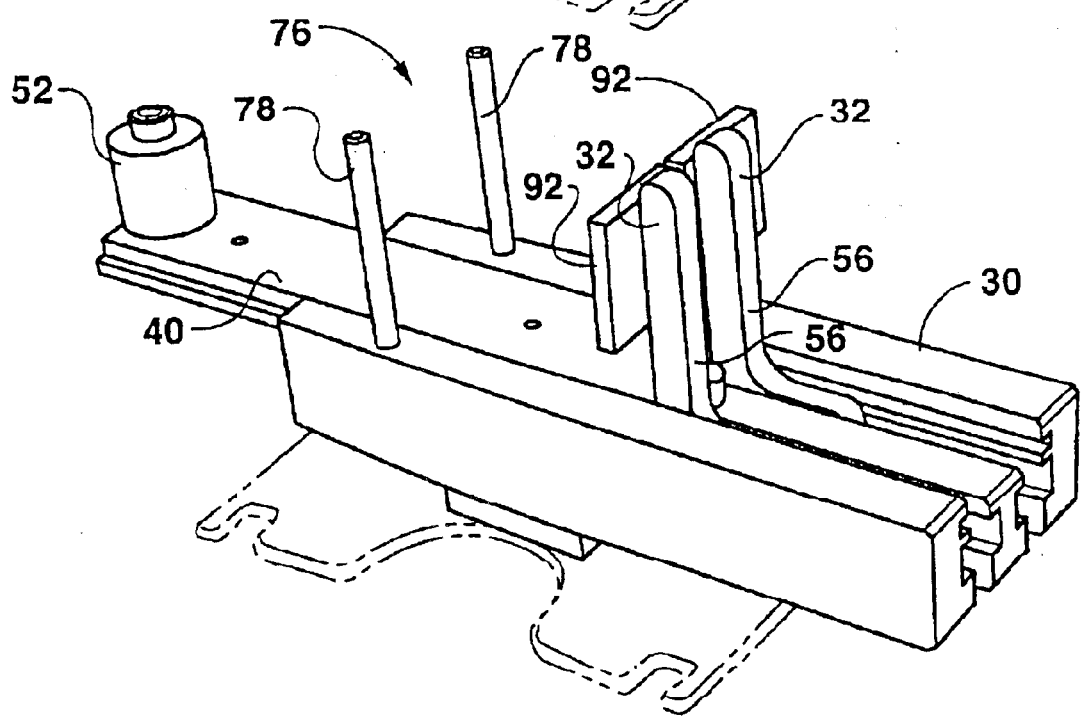
FIG. 10 is a perspective view of an alternate embodiment of a conveyor link having flat plates attached to the gripper members.

As shown in FIG. 10, gripping members 32 have been augmented with flat plates 92. Plates 92 are wider than gripping arms 56, thereby providing a wider surface for contact or potential contact depending on spacing of the objects being conveyed.

Figure 11:
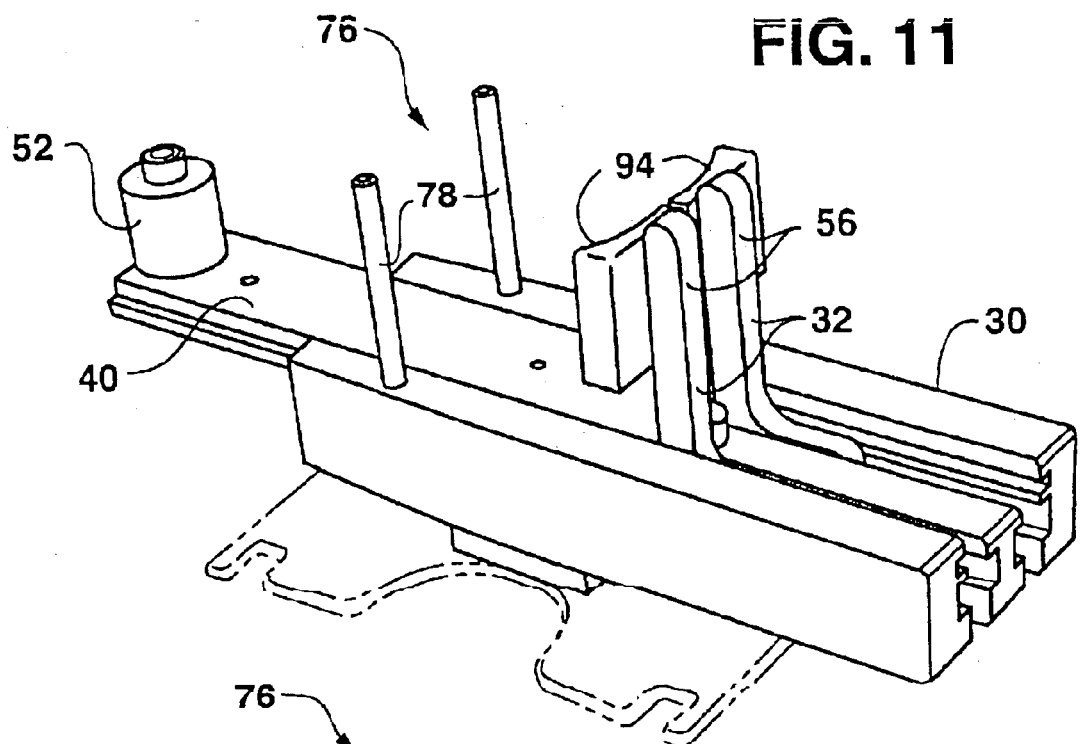
FIG. 11 is a perspective view of an alternate embodiment of a conveyor link having curved plates attached to the gripper members.

As shown in FIG. 11, curved plates 94 may also be utilized on gripping arms 56 of gripping members 32. Curved plates 94 allow for a more secure location of an object being conveyed at the center of body 30. Alternatively, adapter 90 as shown in FIG. 9 may have such a curved surface shape, or plates 94 may have a slanted rather than rounded shape. As a further alternative, both a contoured adapter 90 and contoured plates, such as plates 94 could be utilized if desired, again depending upon the application.

Figure 12:
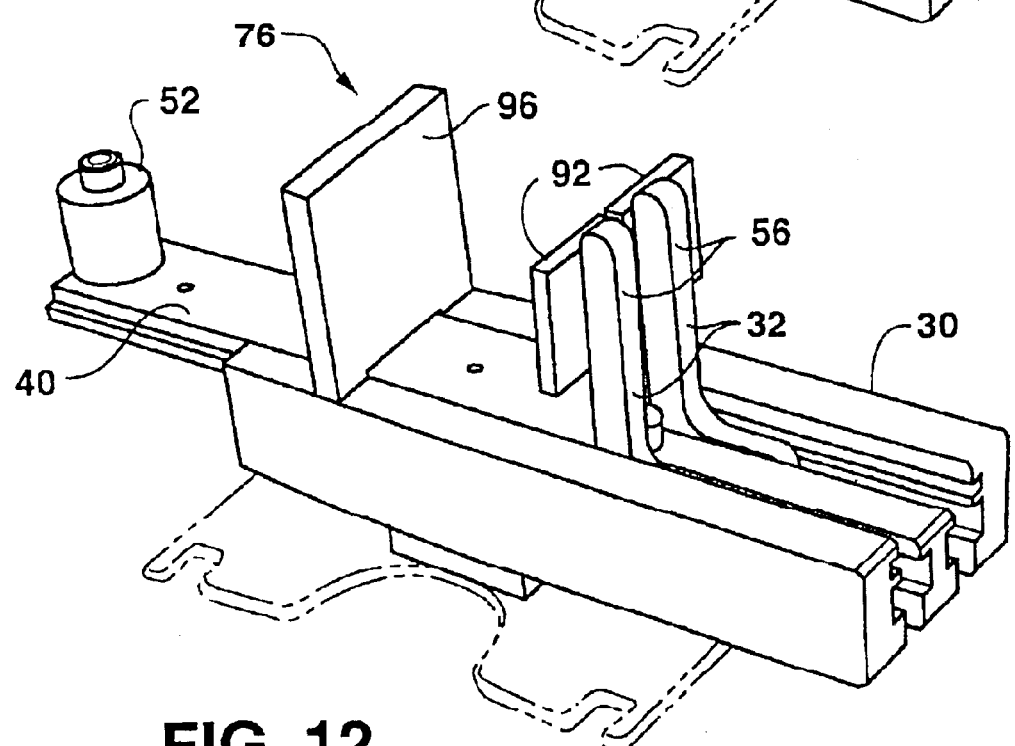
FIG. 12 is a perspective view of an alternate embodiment of a conveyor link having a fixed wall member and flat plates attached to the gripper members.

Another example of a link is shown in FIG. 12, in which flat plates 92 are utilized on gripping members 32, and fence 76 comprises a flat plate 96. Here, use of flat plates does not necessarily cause a centering of a conveyed object atop link 12. If desired, flat plate 96 could be formed integral with or attached to body 30, or it could be formed as an adapter attached to pins 78, as discussed above. Further, various of the different options for attachment to gripping members 32, and the various different options for fence 76 may be mixed and matched in any different way depending upon the desired application.

Figure 13:
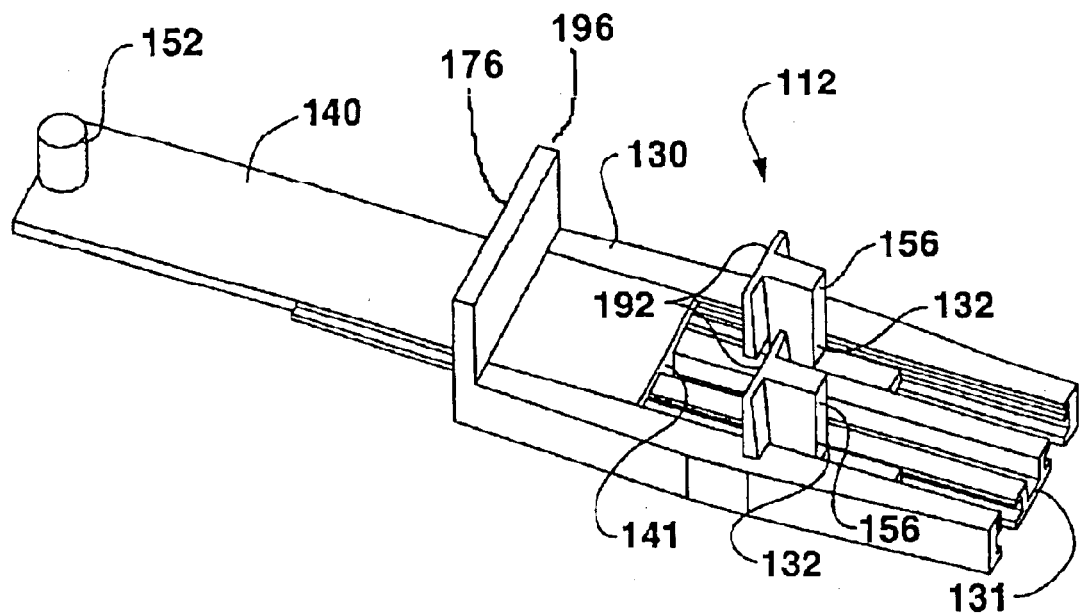
FIG. 13 is a perspective view of an alternate embodiment of a link member as in FIG. 12.
Figure 14:
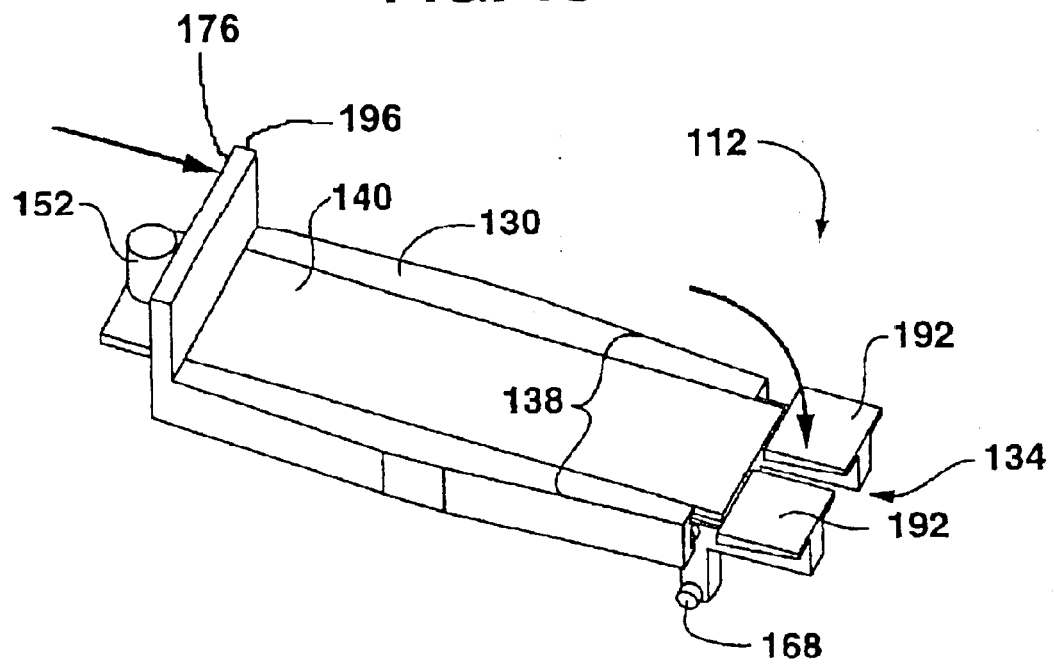
FIG. 14 is a perspective view of the conveyor link of FIG. 13 with gripping members moved to the opened position.

FIGS. 13 and 14 show an additional alternative embodiment in which a link 112 includes a body 130, a slider 140, and gripping members 132. Gripping members 132 include integrally formed plates 192, and fence 176 comprises a flat plate 196. An additional positioning groove 131 is disposed atop body 130 and receives a rib 141 extending from slider 140. A single cam follower 152 is disposed on slider 140. The operation of this embodiment is substantially similar to the operation of the previous embodiments. As shown in FIG. 14, use of flat plate 192 on gripping member 132 provides an additional platform across which objects may be slid onto link 112, as would also be possible with the embodiments shown in FIGS. 10 and 12.

Figure 15:
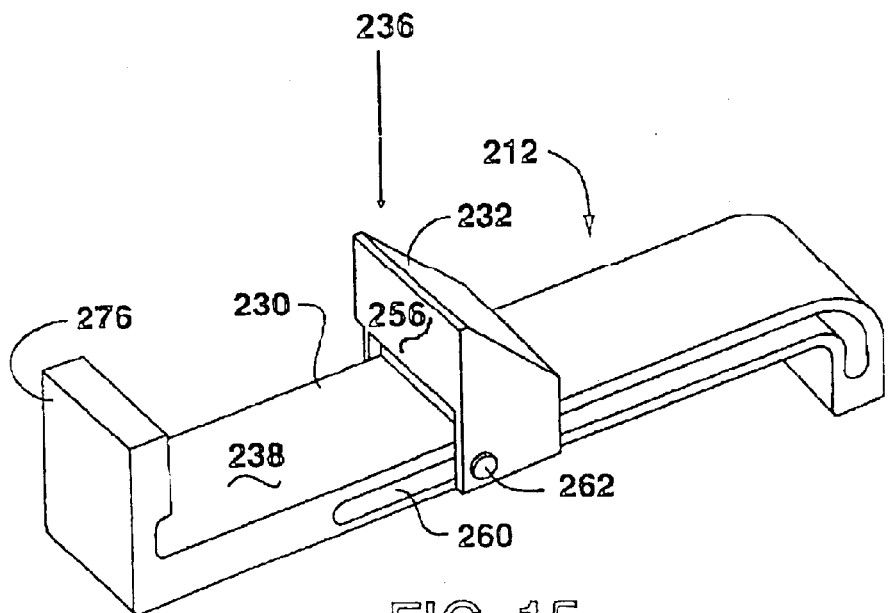
FIG. 15 is another embodiment of a conveyor link according to the present invention in a gripping position.
Figure 16:
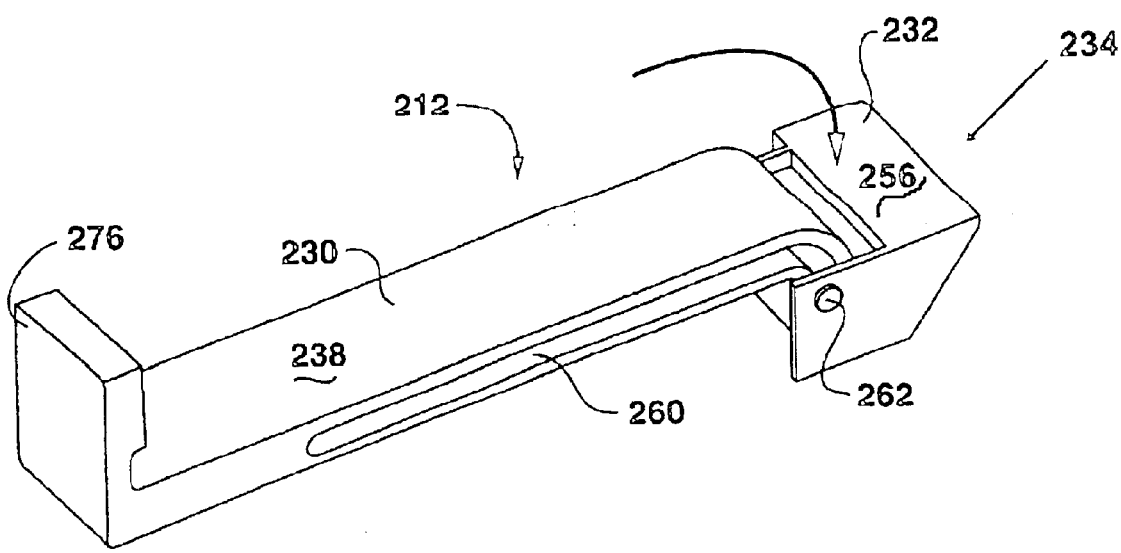
FIG. 16 is a perspective view of the link of FIG. 15 in the opened position.

Another alternative embodiment is shown in FIGS. 15 and 16. In this embodiment, links 212 include a body 230, a fence 276, and a single slidable gripping member 232. The gripping member is moveable between a first position 234 (shown in FIG. 16) to a second position 236 (shown in FIG. 15). When in second position 234, gripping member 232 is disposed below a conveying surface 238 of link 12, as with the embodiments above. Gripping member 232 includes a gripping portion 256 mounted via an axle 262 to body 230. Gripping member 232 is urged toward second position 236 via a spring member (not shown) and may be moveable toward the position shown in FIG. 16 by direct contact with a cam (not shown).

Figure 17:
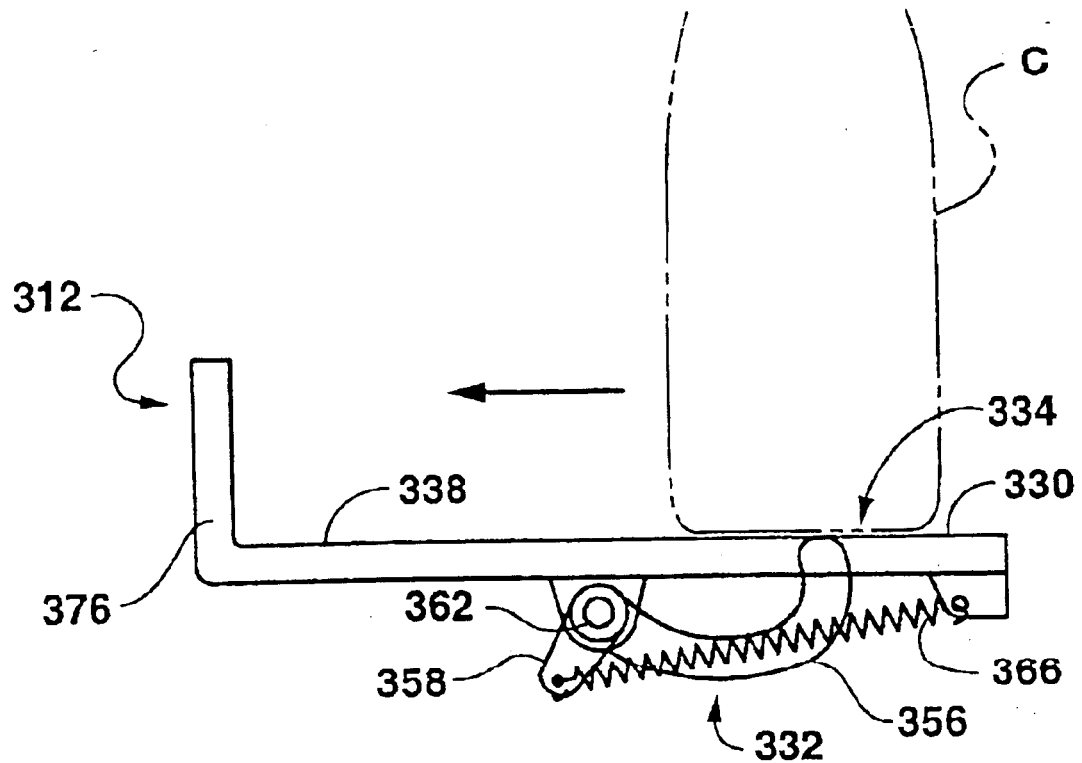
FIG. 17 is a diagrammatical representation of another embodiment of a conveyor link with a gripping member in the opened position.
Figure 18:
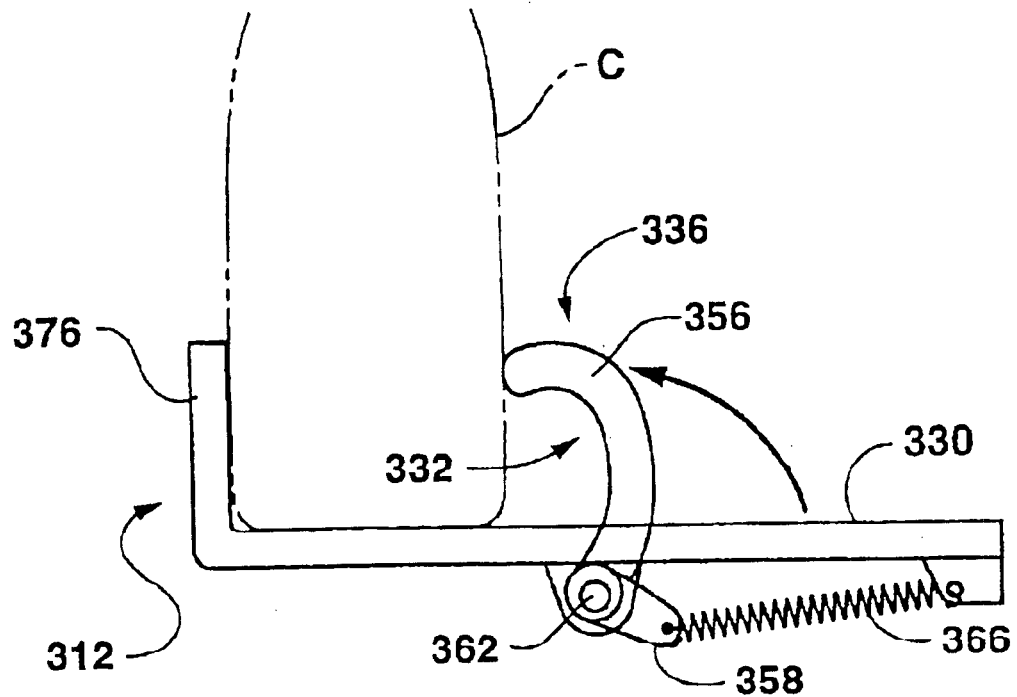
FIG. 18 is a diagrammatical representation of the conveyor link of FIG. 17 with the gripping member in the gripping position.

FIGS. 17 and 18 show another alternative embodiment of a link 312 according to the present invention. In this embodiment, link 312 includes a body 330 with an attached gripping member 332. Gripping member 332 pivots relative to body 330 from a first position 334 (as shown in FIG. 17) to a second position 336 (as shown in FIG. 18) through a slot (not shown) in body 330. Spring member 366 urges gripping member 332 toward second position 336. When gripping member 332 is in first position 334, the gripping member is beneath conveying surface 338 of body 330. A gripping arm 356 of gripping member 332 contacts the object to be conveyed, such as a container C, and a positioning arm 358 is attached to spring member 366. A cam member (not shown) may contact and urge gripping member 332, such as via positioning arm or a cam follower mounted thereon (not shown) back to the position shown in FIG. 17. In this embodiment, gripping member 332 pivots about an axis substantially parallel to direction of transport T (shown in FIG. 1).

Another alternative embodiment is shown in FIGS. 19 and 20. In this embodiment, a gear mechanism is provided for moving a gripping member 432 and slider 440 relative to a body 430 of a link 412. As shown, a spring member 466 urges slider 440 to the left, and a cam follower 452 is disposed at an end of slider 440. A cam (not shown) may move slider from the position shown in FIG. 19 to the right, and ultimately to the position shown in FIG. 20, thereby rotating gripping member 432 downward below the conveying surface 438. Gripping member 432 may be mounted on an axle 462 within body 430 so as to be able to extend from a slot 460. As shown, the gear mechanism comprises a "rack" 441 provided on slider 440, and a "pinion" 433 is provided on gripping member 432. If desired, other gear arrangements may be possible, including intermediate gears.

A fixed fence 476 is shown with this embodiment but, as above, other fence designs may also be utilized. Also, only one gripping member 432 is shown on link 412, but multiple gripping members could, of course, also be utilized. Also, multiple rack and pinion arrangements on multiple sliders and gripping members could be used on a single link. As shown, slider 440 is disposed beneath a conveying surface 438 of body 430.

Depending on factors such as the number and arrangement of teeth on rack 441 and pinion 433, as well as the length of slider 440, and the dimensions of the cam (not shown) used with cam follower, the positioning of gripping member 432 relative to body 430 when contacted by the cam is selectable. Therefore, gripping member 432 need not be driven all the way to the position shown in FIG. 20 to open the gripping member, if so desired for certain applications. Such is true for the previously mentioned embodiments as well. Therefore, although it may be desirable in some situations to open the gripping members of the various embodiments to the point that they are "beneath" the respective conveying surfaces (when the links are upright), such is not a requirement of all aspects of the present invention.

Figure 21:
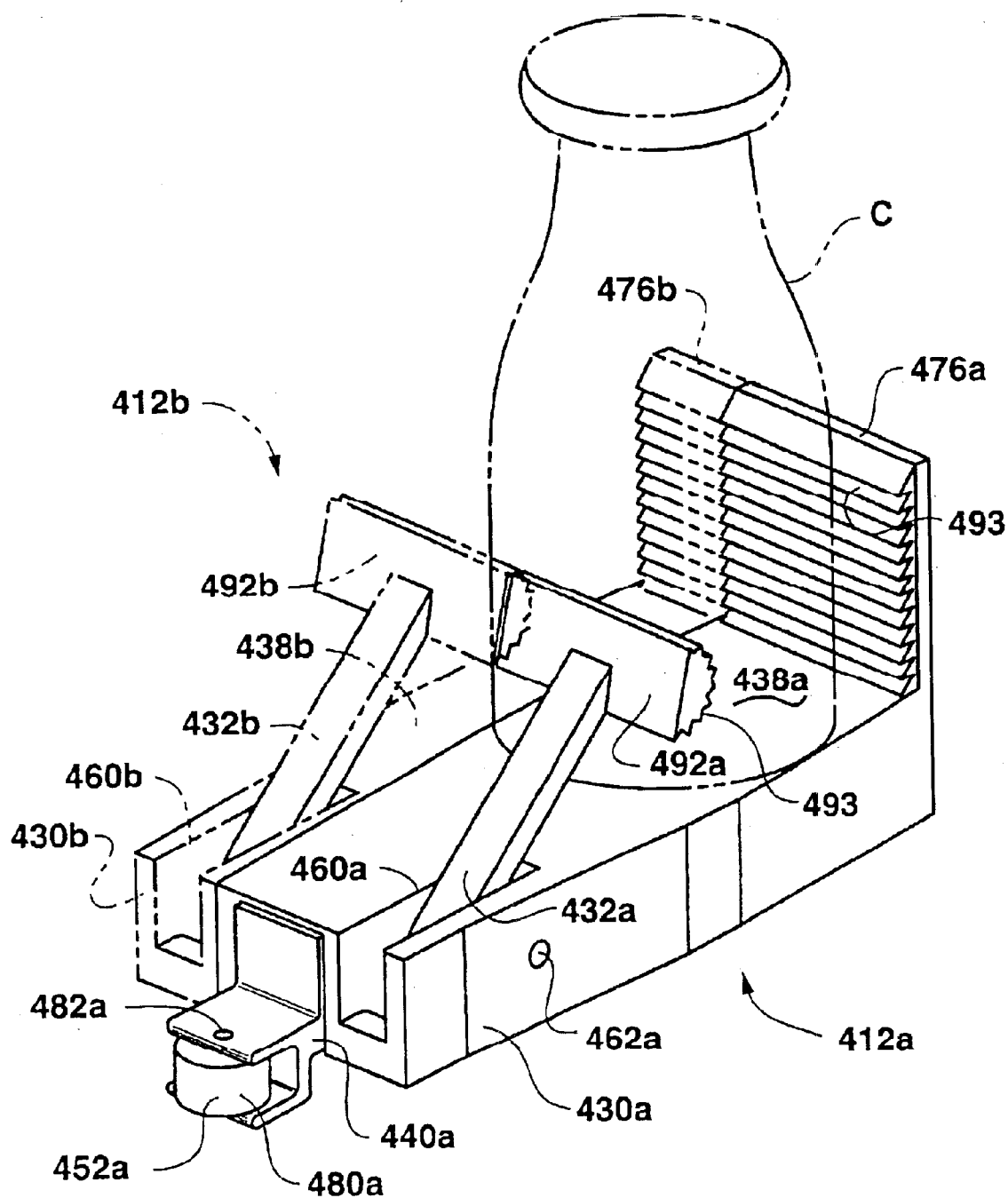
FIG. 21 is a perspective view of a modified version of the conveyor link of FIG. 19, with two offset gripping arms on the gripping member in a gripping position.
Figure 22:
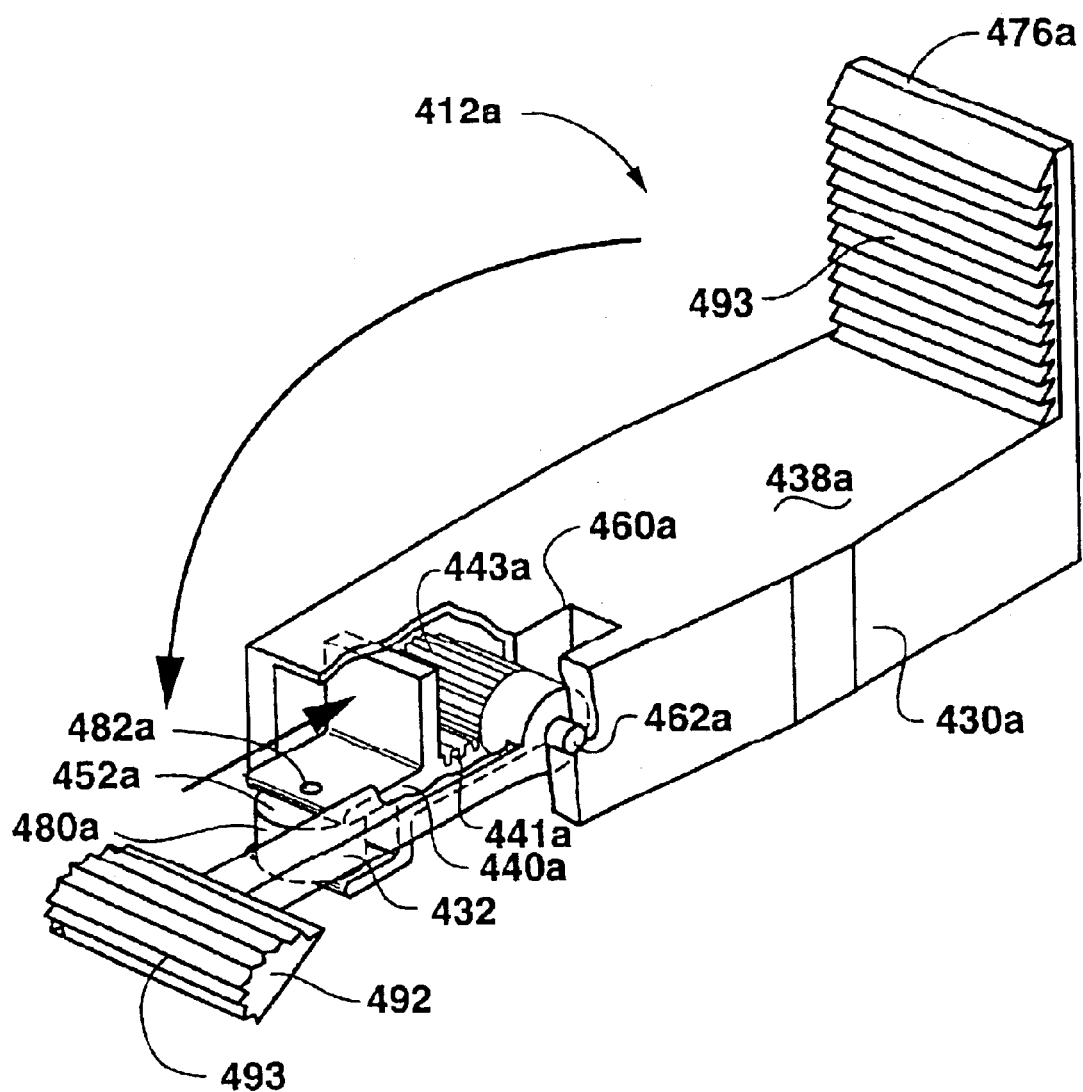
FIG. 22 is a partial cutaway view of the conveyor link of FIG. 21 in an opened position.

FIGS. 21 and 22 show variations of the rack and pinion embodiment shown in FIGS. 19 and 20. In FIGS. 21 and 22, link 412a includes a body 430a, a slider 440a, a spring member 466a and a gripping member 432a. Gripping member 432a is offset from rack 441a and pinion 433a. Optionally, a second gripping member 432b may also be used extending from a lateral portion 412b of body 412a. Slots 460a and 460b, if used, are spaced from rack 441a and pinion 433a, so as to keep any stray materials from entering body 430a at the slots and potentially interfering with the operation of rack and pinion or spring member 466a. Such an offset slot could also be used with a single gripping arm embodiment, as in FIGS. 19 and 20, or with various of the proceeding embodiments as well. Fences 476a and 476b, as well as gripping members 432a and 432b have flexible material 493 at their contact surfaces for securely gripping the conveyed objects.

Figure 23:
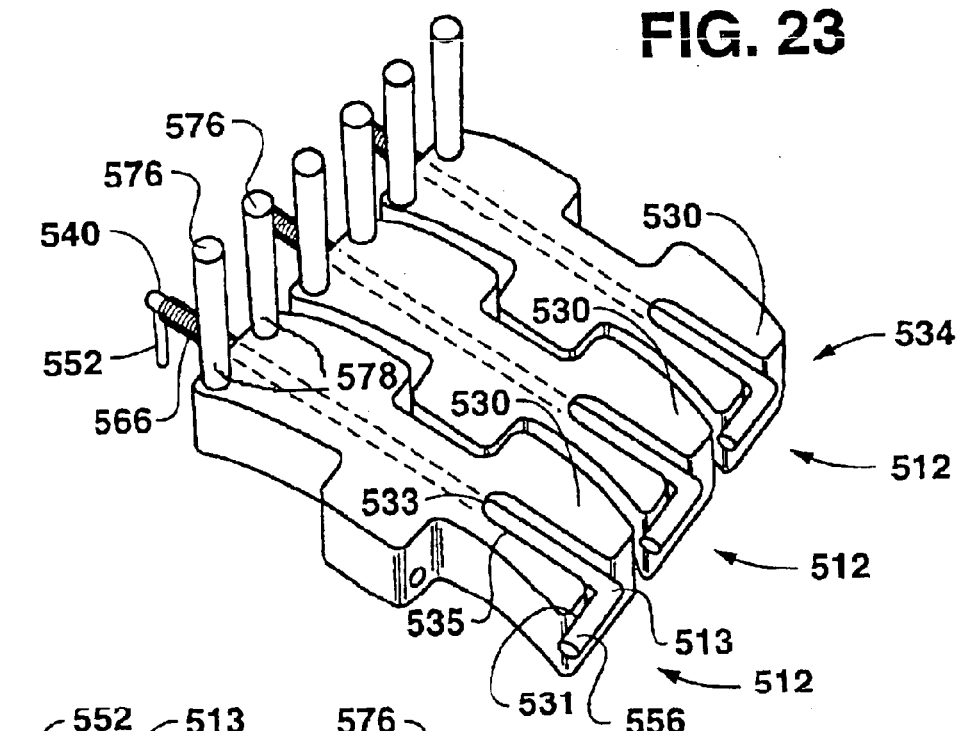
FIG. 23 is a perspective view of three links of a link conveyor according to another embodiment of the invention including a rotatable and slidable gripping member.
Figure 24:
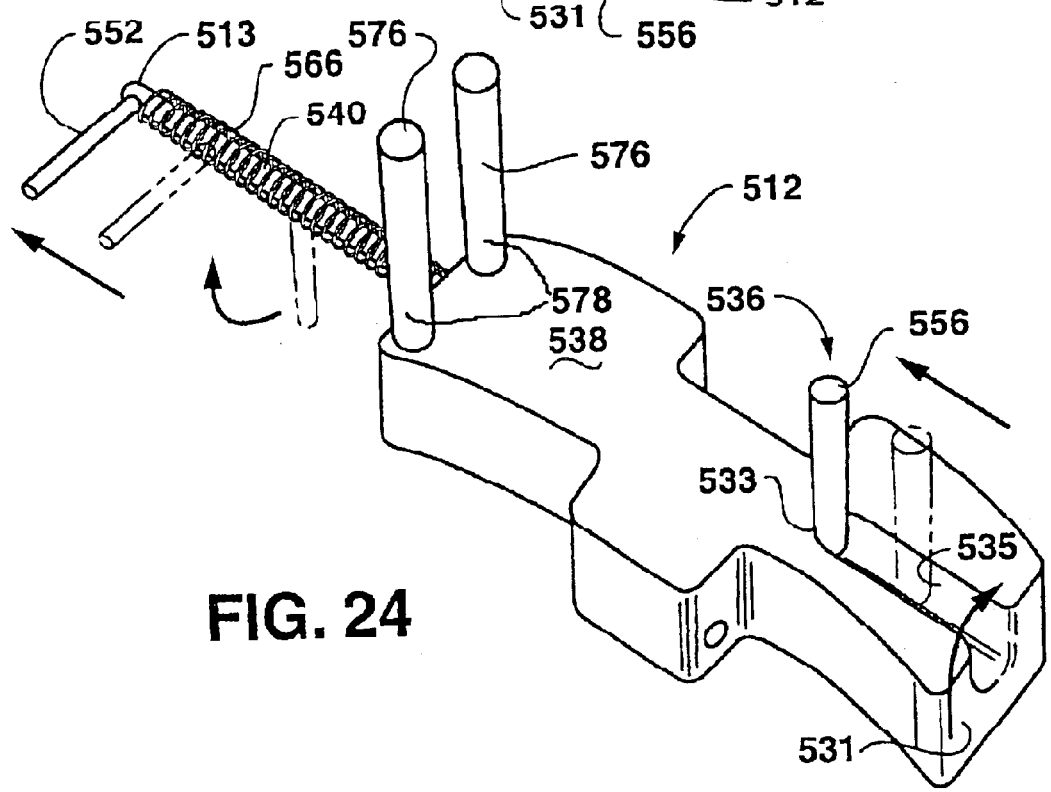
FIG. 24 is an enlarged perspective view of a link as shown in FIG. 23 showing movement of a gripping member from an opened position to a gripping position.

FIGS. 23 and 24 show yet another alternative embodiment. In this embodiment, links 512 include an integral slider and gripping member mechanism. Links 512 include a body 530, a fence 576 comprising pins 578, and a slider/gripper 513 including a slider portion 540 and a gripping arm 556. A spring member 566 urges slider/gripper 513 in the direction shown in FIG. 24. A pin 552 extending from an end of slider/gripper 513 serves both as a cam follower and a shoulder for spring member 566. When slider/gripper 513 is in the position shown in FIG. 23, gripping arm 556 is disposed beneath conveying surface 538 of link 512. Thus, as above, objects to be conveyed such as containers may be slid laterally onto the links 512, although slider/gripper 513 need not be moved to the position shown in FIG. 23 to allow loading or unloading for all applications.

Slider/gripper 513 is held in place (as shown in FIG. 23) by friction between gripping arm 556 and a shoulder 531 on body 530 due to spring member 566. Upon contacting a cam surface (not shown), cam follower 552 pivots, as indicated in FIG. 24. Such pivoting rotates slider/gripper 513 until gripping arm 556 is freed from shoulder 531. At that point, under the influence of spring member 566, slider/gripper 513 slides along link 512 until gripping arm 556 reaches an end 533 of groove 535, hits a stop, or until it contacts a conveyed object. To move slider/gripper 513 from the position shown in FIG. 24 back to the position shown in FIG. 23, various different camming options are possible. For example, it is possible to cam gripping arm 556 so as to slide and then rotate it back into place. Alternatively, cam follower 552, or simply the adjacent end of slider/gripper 513, could be cammed and rotated into place.

As shown in FIG. 24, slider/gripper 513 may rotate about an axis substantially perpendicular to the direction of transport T when moving from the first position (shown in FIG. 23) to the second position (shown in FIG. 24). Slider/gripper 513 also slides when moving between these two positions.

Each of the embodiments discussed above in FIGS. 1–24 include certain common elements and concepts. First, each includes a plurality of links with gripping members that may be placed in an orientation below the conveying surface of the links. Such orientation allows for (but does not require) slidable loading and unloading of the conveyor laterally. The links may be inverted with or without a gripped object, and the links may even be loaded or unloaded in an inverted position. Also, the links provide for a reasonably secure and optionally self adjustable positioning of the gripping members so as to hold objects being conveyed during transport. As indicated above, many of the features of the different embodiments may be altered or combined in various ways depending upon the particular desired application. The gripping members could be opened so as to move below the conveying surface, partially opened, and/or closed by various different camming type functions or even by the transport of objects themselves. The present invention is thus not limited to any of the particular embodiments set forth above in terms of each of the specific features of any given embodiment, but the disclosure as a whole should be considered to determine the various options that are possible.

Also, although the above embodiments provide beneficial orientations whereby the gripper members may be "opened" so as to place the gripping member beneath a conveying surface of a link, such orientation is not required according to the invention. Such orientation does provide benefits such as slidable lateral loading, but such loading is not required, and simply opening the gripping members somewhat will suffice for many applications. Thus, any gripping member that opens or flexes enough to allow loading and unloading of the link, by virtue of a camming function or contact with a conveyed object are all within the scope of the invention.

Also, it would be possible to arrange certain of the embodiments so that any fixed fence was moveable, or even was replaced by duplicated moveable gripping members 32. While that could add some complexity to the links, such design is considered to be well within the scope of one skilled in the art to carry out. In such case, the link would include two gripping members, oppositely disposed so as to be able to grip a container therebetween. The gripping members would then move toward each other when moving from the first position to the second position.

The remaining embodiments of the invention described below include alternate embodiments of a gripping conveyor. In the immediately following embodiments, the various disclosed gripping members can not, however, move to a position below the conveying surface of the individual links. Instead, the gripping members are linearly or arcuately slidable relative to the link bodies. As discussed above, such positioning does provide certain benefits, but would not be required in all applications.

Figure 25:
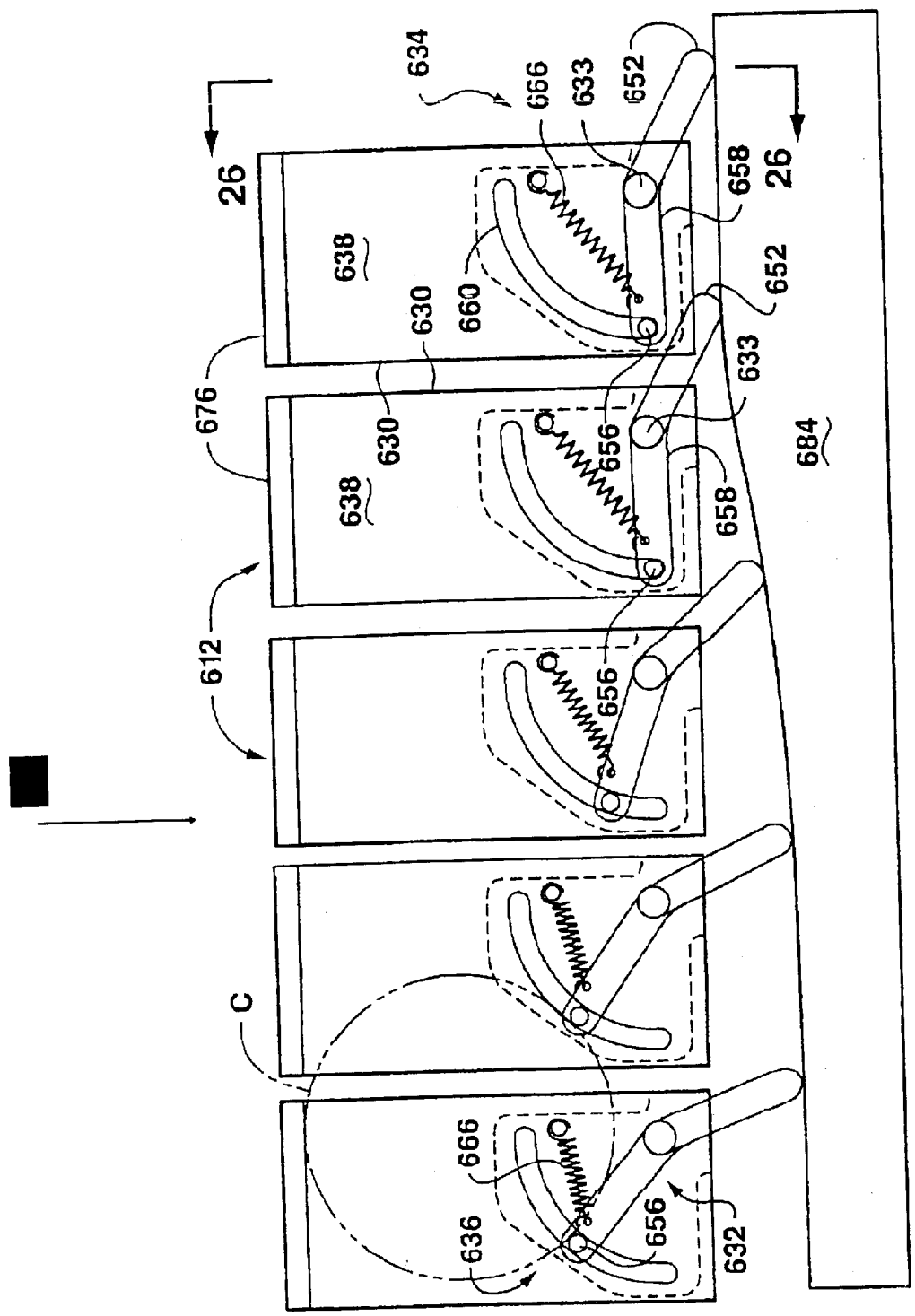
FIG. 25 is a top diagrammatical view of another embodiment of a conveyor link according to the present invention including a pivoting gripping member driven by a cam member.
Figure 26:
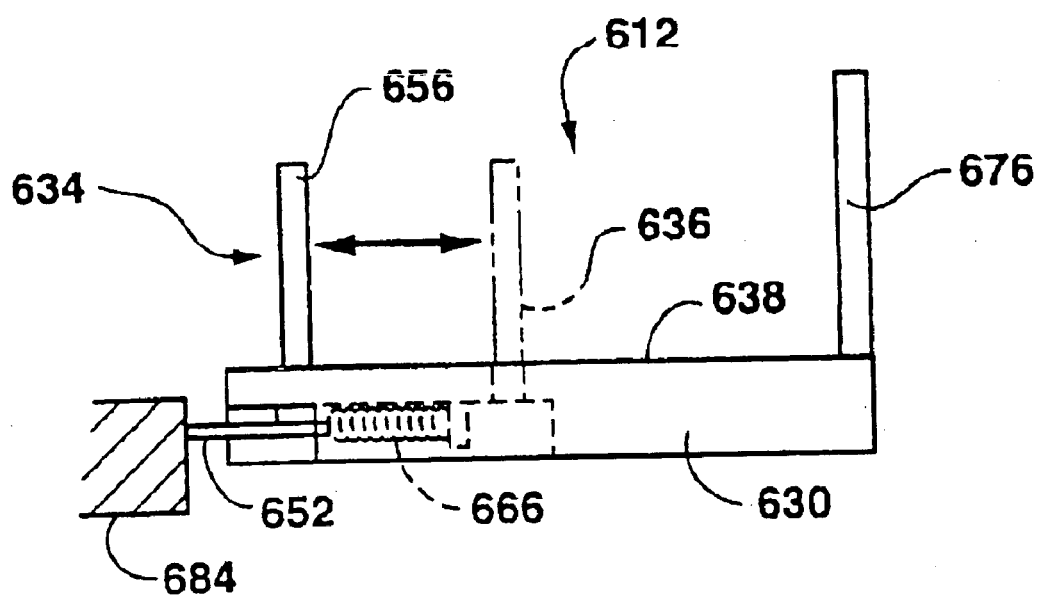
FIG. 26 is a side diagrammatical view of the conveyor link taken along line 26—26 in FIG. 25.
Figure 27:
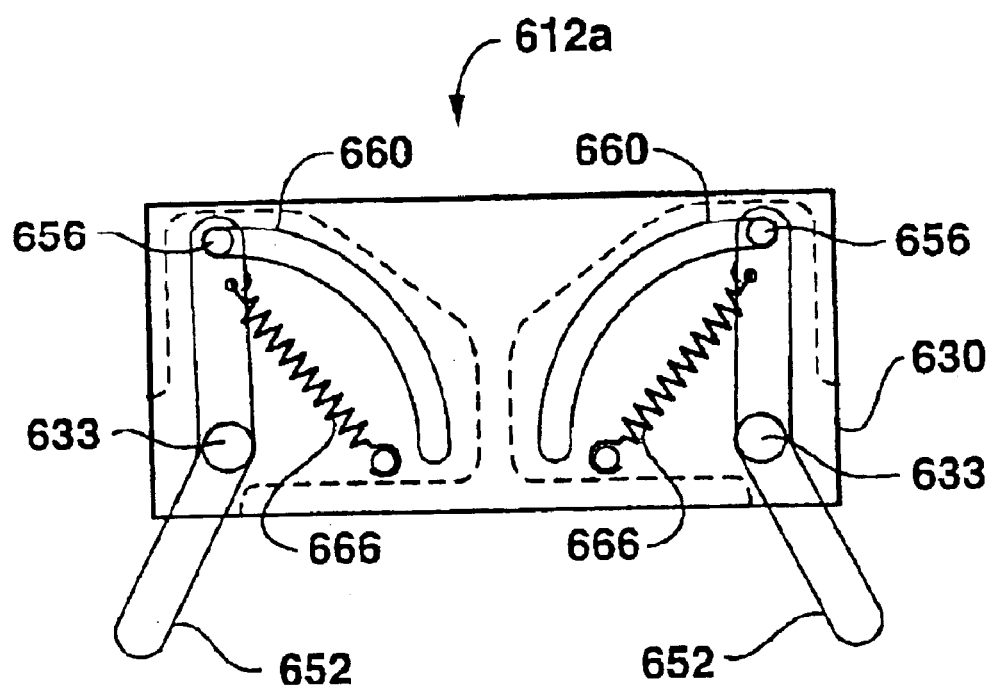
FIG. 27 is a top diagrammatical view of alternate conveyor link as in FIG. 25, except that the conveyor link includes two opposing gripping members.

As shown in FIGS. 25–27, a conveyor 610 includes a plurality of links 612. Individual links 612 include a body 630 and a gripping member 632 that is moveable from a first opened position 634 to a second gripping position 636. Gripping member 632 includes a gripping arm 656, a positioning arm 658, and a cam follower 652. Gripping member 632 is pivotally mounted to body 630 around pivot points 633. Gripping member 632 extends from beneath body 630 through a curved slot 660.

It should be understood, as in the above embodiments, that the first opened position 634 and second gripping position 636 need not be defined by the limits of travel of gripping arm 656 within slot 660. Thus, the gripping position 636 may be defined by the size and/or orientation of the object being conveyed, or by some other stop, and the opened position 634 may be any position wide enough to release the gripping member 632.

A cam 684 is shown in FIG. 25 for influencing the position of gripping member 632. If conveyor 610 were moving toward the right, cam 684 would be opening the gripper member 632, and if conveyor 612 were moving to the left, cam 684 would be allowing the gripping member 632 to close to grip the conveyed object, as urged in that direction by spring members 666. As shown, the conveyed objects may be gripped between gripping members 632 of adjacent links 612 and fences 676. The fences 676 may have various different shapes, other than the flat plate as shown, and different attachments and shapes are possible for use on the end of gripping arm 656, if desired. The conveyor of FIGS. 25 and 26 therefore shows an alternate manner of securely conveying objects while gripped on a conveyor.

FIG. 27 shows a variation of the conveyor of FIGS. 25 and 26, in which oppositely disposed gripping members and related parts are shown on link 612a. Thus, in FIG. 27, fence 676 is replaced by another gripping member 632 and related elements. Such orientation may be desirable in some applications.

Figure 28:
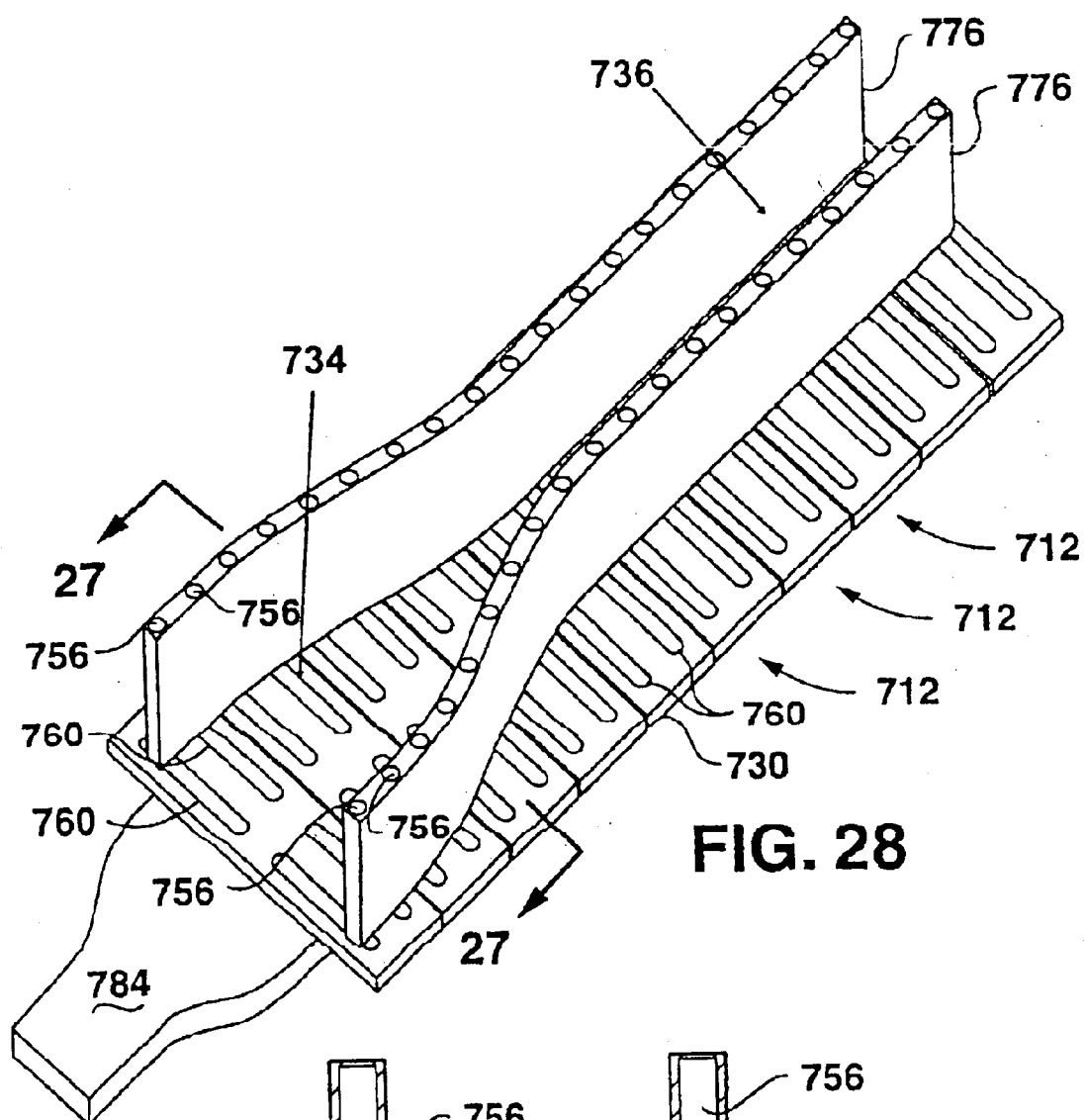
FIG. 28 is a perspective view of a conveyor including a plurality of links having slidable and opposed gripping members with a flexible fence member attached to the gripping members.
Figure 29:
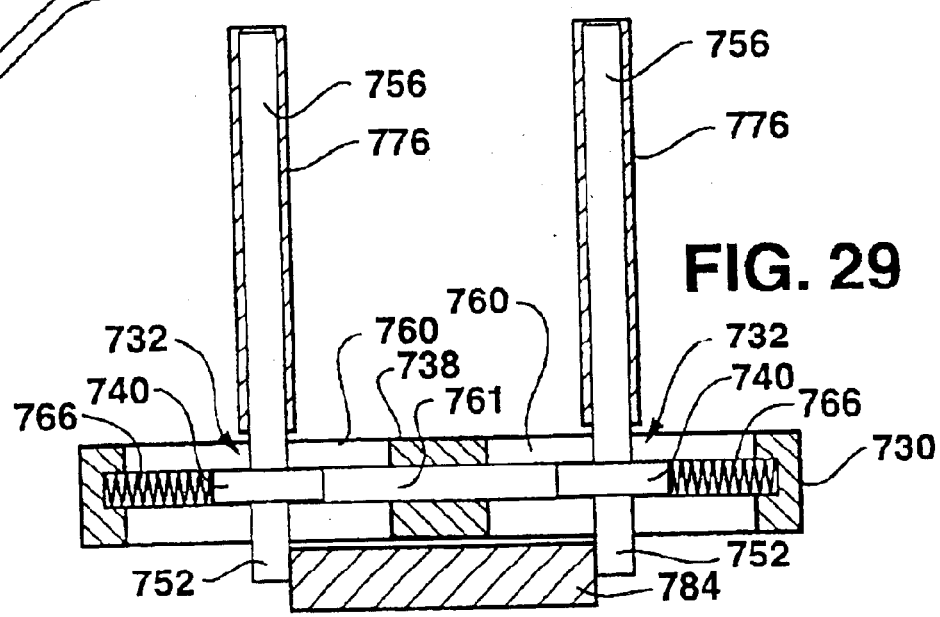
FIG. 29 is a sectional view through the device of FIG. 28 taken along lines 29—29.
Figure 30:
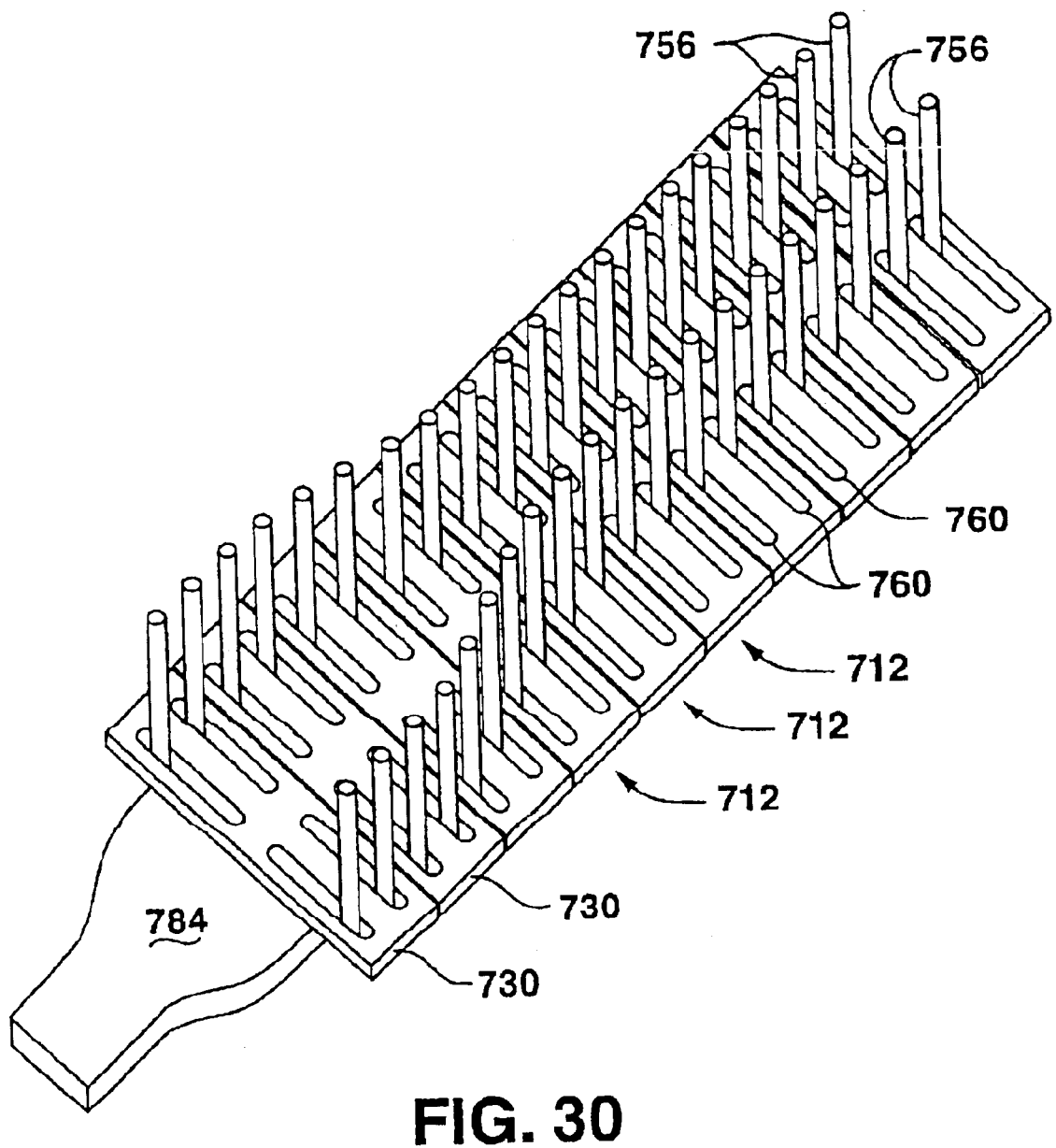
FIG. 30 is a perspective view of a conveyor including a plurality of links having slidable and opposed gripping members as in FIG. 28, but without the flexible fence member.

FIGS. 28–30 show another embodiment including a link 712 that includes slidable gripping members 732. As with FIG. 27, the gripping members 732 are disposed in opposed pairs, although a single set of gripping members and a fixed fence could alternatively be used. Gripping members 732 include gripping arms 756 extending from slider portions 740. Spring members 766 urge gripping members 732 toward the center of link 712. Gripping members 732 slide in slots 760 within bodies 730 of links 712. Sliders 740 (see FIG. 29) are disposed substantially within link 712 for contacting spring members 766. Sliders 740 slide in a wide portion 761 of slots 760 to thereby position gripping members 732. As with previous embodiments, the second gripping position 736 is self-adjustable, either at the limit of the groove 760 or depending upon the size and orientation of the conveyed object. A cam 784 may contact a cam follower 752 attached to a bottom of gripping members 732 to move gripping members between a first spread position 734 and a second gripping position 736.

As shown in FIGS. 28 and 29, an optional flexible fence 776 extending between a plurality of gripping members 732 may be provided. Such flexible fence 776 may provide a more secure gripping of containers in certain applications. However, as shown in FIG. 30, such flexible fence 776 need not be used within the scope of the invention.

Thus, the further additional embodiments disclosed above include conveyors having gripping members which are slidable relative to the respective conveyor lengths. Some of these embodiments include gripping members that slide along an arc while attached to a pivotable member, and other slide along a straight line. The embodiments also provide a self-adjustable mechanism for contacting and gripping objects to the transported. The gripping members of adjacent links may contact individual transported objects and may move to different positions to contact different portions of those objects and hold them securely. Transported objects may thus be securely transported in an aligned fashion, if desired, for various types of procedures.

Yet another embodiment of a conveyor 810 is shown in FIGS. 31–36. Conveyor 810 includes various elements of certain previously discussed embodiments, but also includes certain different features. For example, conveyor 810 includes a plurality of links 812 connected to a drive mechanism (not shown). Each link 812 includes a body 830, a gripping member 832 and a slider 840. A cam follower 852 is disposed at an end of slider 840, and a spring member 866 is disposed within body 830. An adapter 892 is disposed at an end of gripping member 832, and a fence 876 is attached to body 830.

Figure 31:
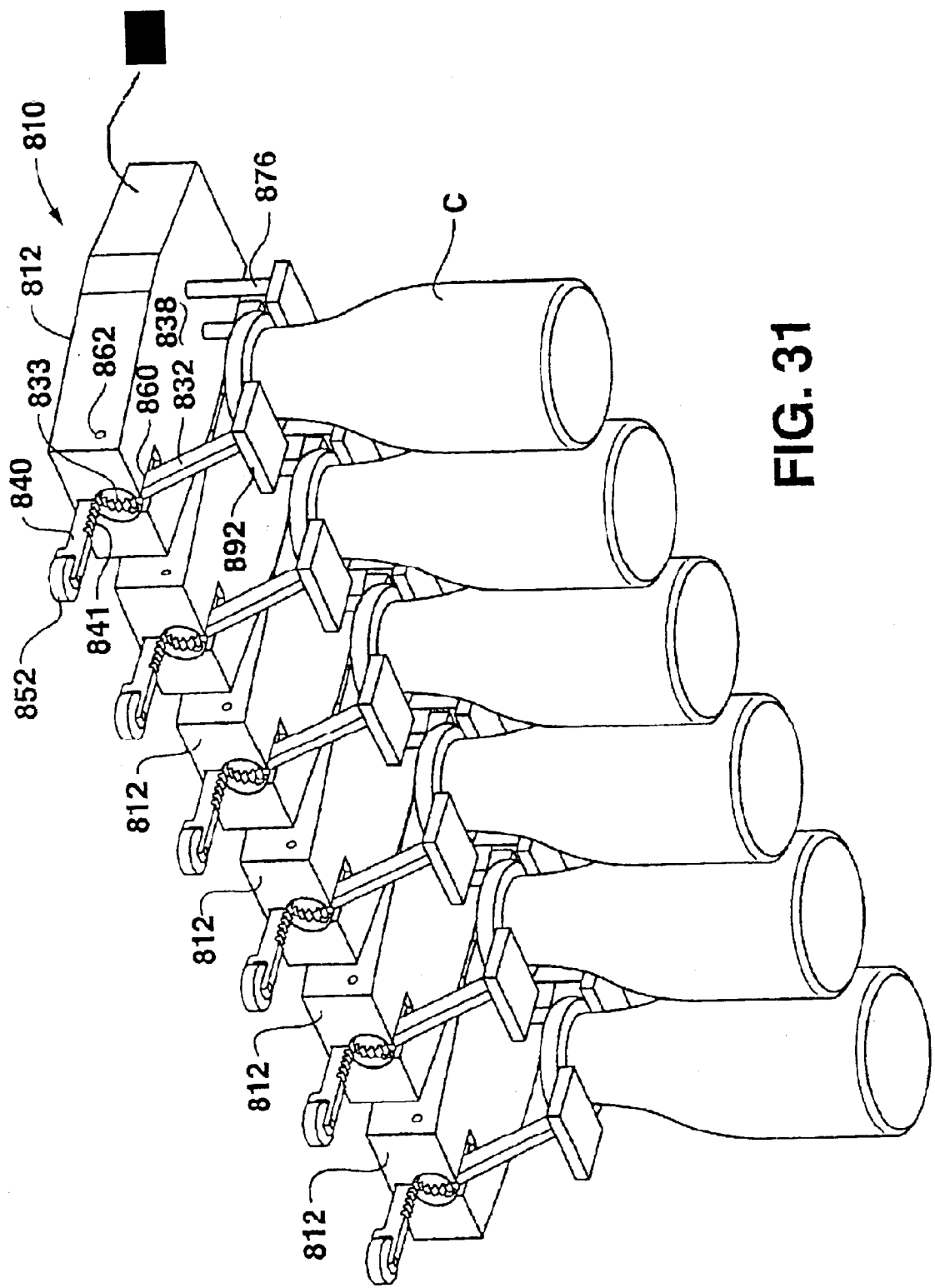
FIG. 31 is a bottom perspective view of another embodiment of a conveyor according to the present invention.
Figure 32:
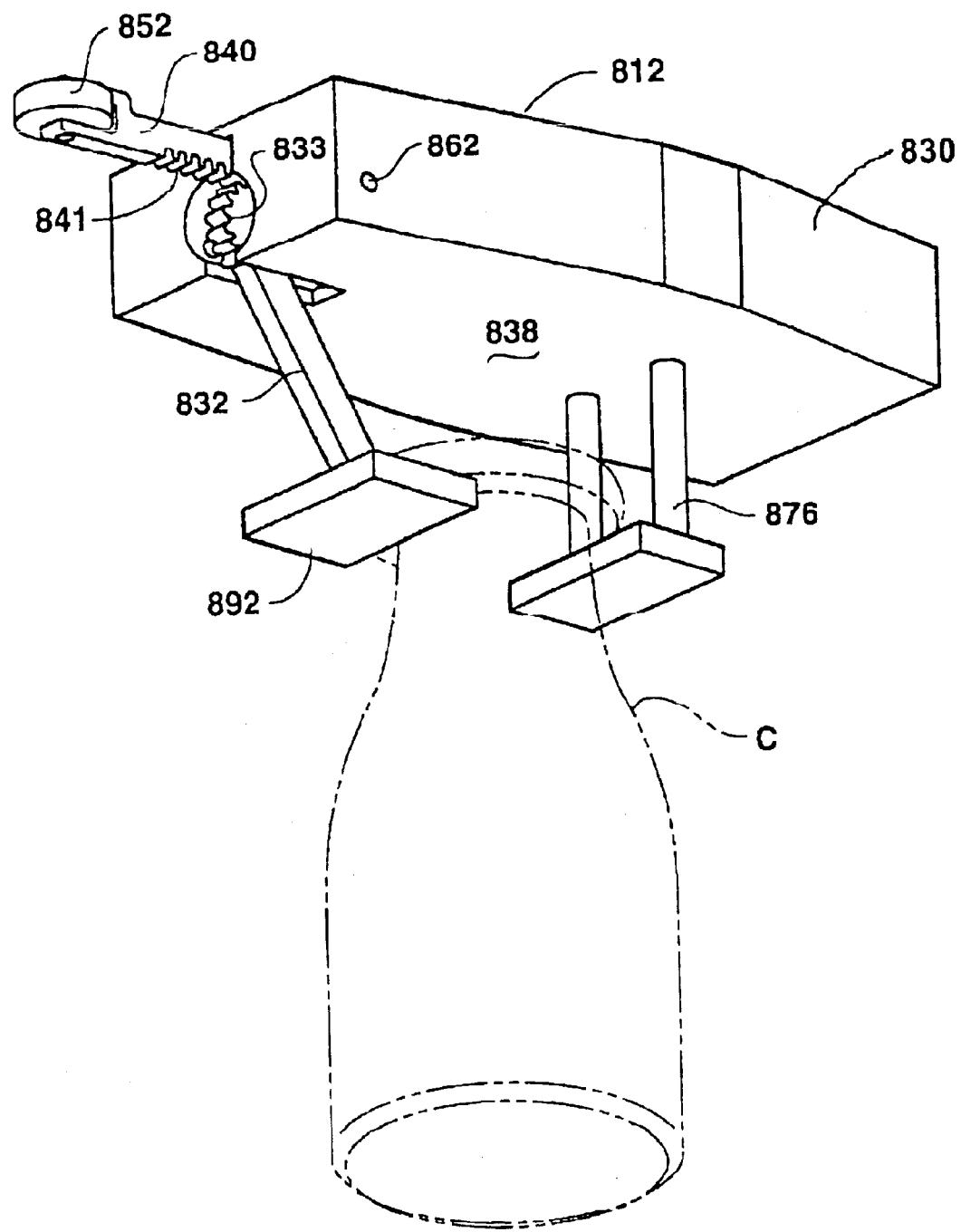
FIG. 32 is an enlarged view of one link of the conveyor of FIG. 31 in a gripping position.
Figure 33:
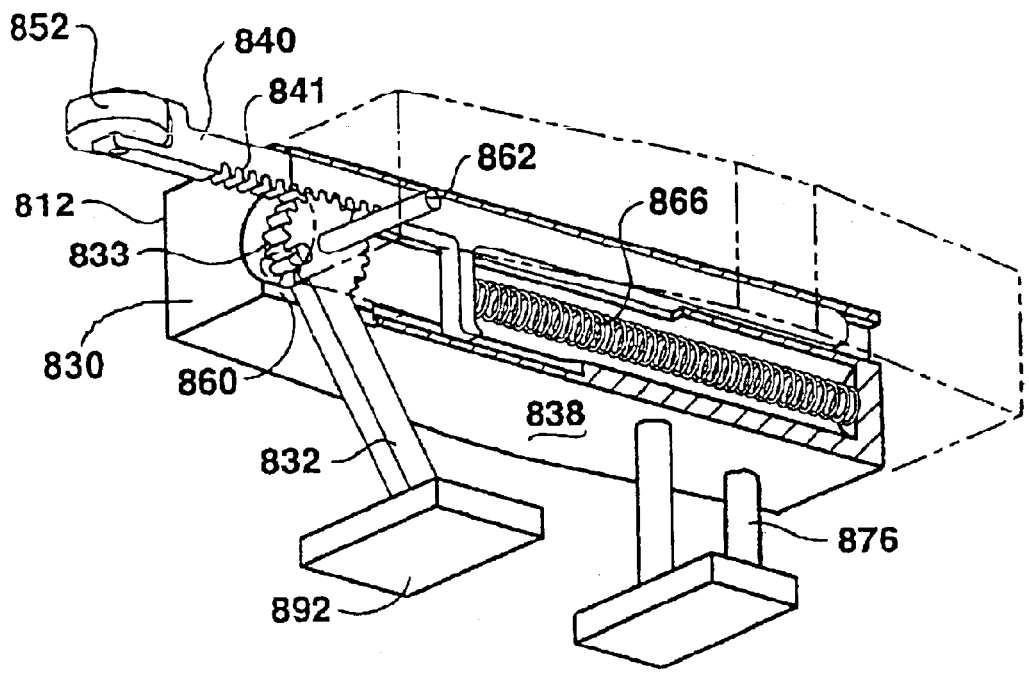
FIG. 33 is a partial cutaway view of the link of FIG. 32 in a gripping position.
Figure 34:
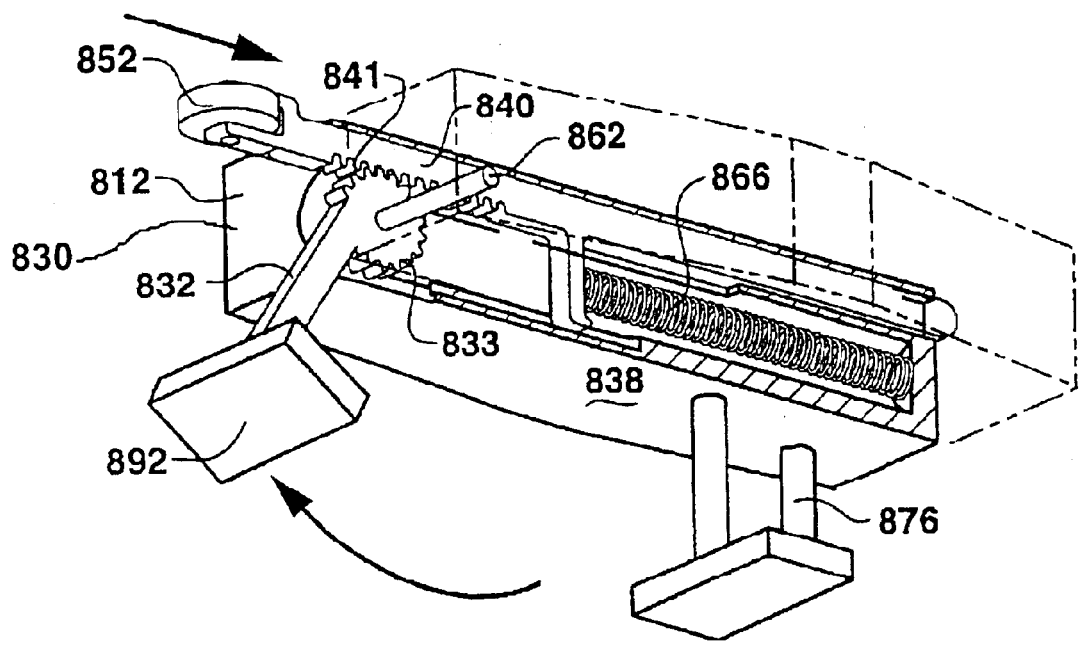
FIG. 34 is a partial cutaway view of the link of FIG. 32 in a partially opened position.
Figure 35:
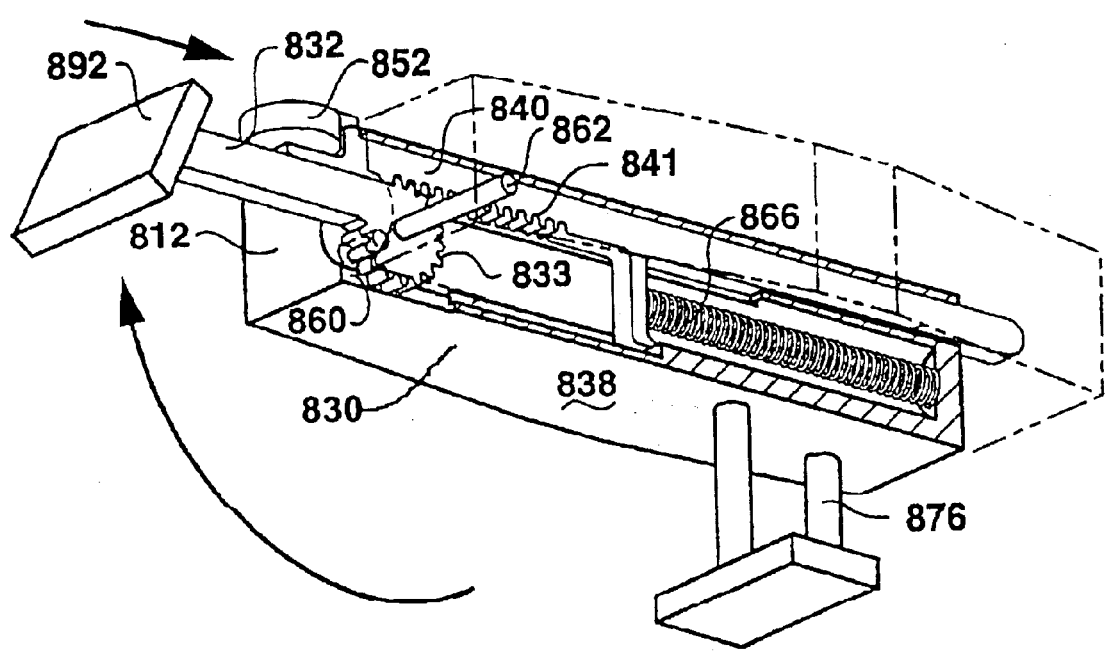
FIG. 35 is a partial cutaway view of the link of FIG. 32 in a fully opened position.
Figure 36:
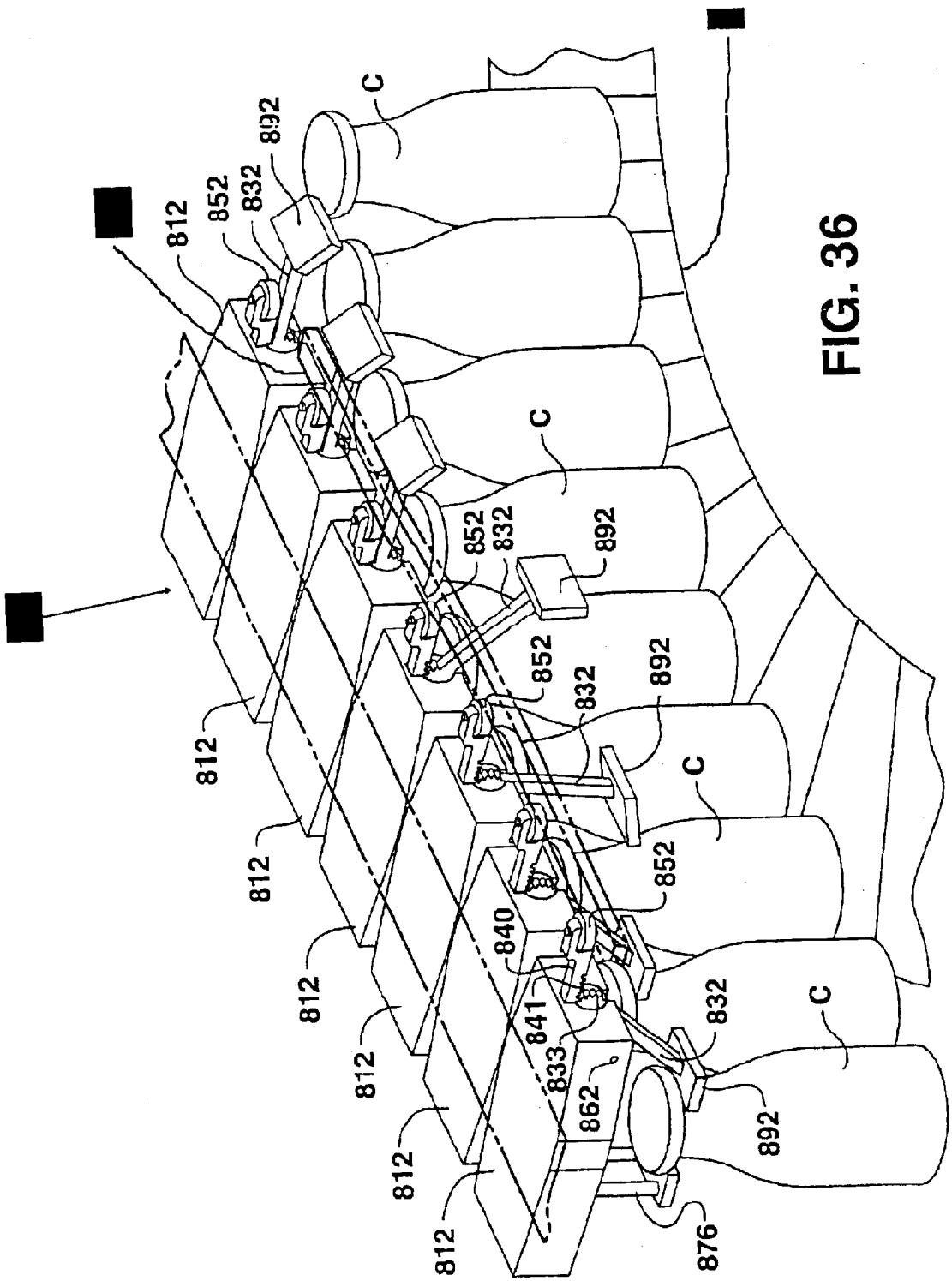
FIG. 36 is a top perspective view of the conveyor of FIG. 31 showing loading or unloading of the conveyor.

Gripping member 832 is moveable between a first open position, shown either in FIG. 34 (a partially opened position) or FIG. 35 (a fully opened position), and a second gripping position, as shown in FIGS. 31–33. When in the gripping position, gripping members 832 may grip an object, such as a container C. As shown, conveyor 810 may be utilized to grip object held spaced from surface 838 of body 830. Thus, if desired, conveyor 810 may be used as an overhead conveyor, gripping bottles by their necks during transport. Conveyor 810 may load or unload containers from above while the containers move along an additional conveyor or platform P, as shown in FIG. 36. Cam 884 may influence slider 840 to move into or out of body 830, thereby opening or closing gripping member 832 around the neck of the container C. In FIG. 36, if conveyor 810 were moving to the right, the conveyor would be releasing the containers; if conveyor 810 were moving to the left, the conveyor would be gripping the containers.

As with previous embodiments, various modifications are possible with the embodiment of FIGS. 31–36. First, the configuration of the gripping member 832 could be modified in the various ways discussed above, or multiple gripping members could be provided for each body, etc. It would also be possible to invert objects utilizing the embodiment of FIGS. 31–36 so that the containers are placed above the conveyor during travel, or the conveyor could be loaded as discussed above with the containers contacting surface 838 of body 830. It should also be understood that, as with the embodiments of FIGS. 31–36, the first open position may be either of the positions shown in FIG. 34 or 35, depending on the desired application or method of loading. Also, it should be understood that any of the previously disclosed embodiments could potentially be utilized in such an overhead loading, unloading, or transport application, or with the conveyed object spaced from the surface of the body of the link, as shown in FIGS. 31–36.

It should be understood that various other modifications and combinations of the above embodiments are contemplated and are also within the scope of the present invention. For example, spring members shown as compression springs could be substituted with tension springs, and vice versa, with corresponding modifications of other related elements. In such cases, movement of cam followers and cams from one side of a link to the other may be required, among other changes. Also, each link may include only one or multiple gripping members. Each gripping member may include only one or multiple gripping arms. Multiple gripping arms may be actuated by a single slider on a link, or each gripping arms may be actuated by a single slider on a link, or each gripping arm may have its own slider. The shape of the link body, the method of attachment to the drive mechanism, the type of drive mechanism, and the disclosed uses of the conveyors herein are also examples only, and no limitations should be drawn from this disclosure. Thus, the present invention contemplates that any and all such subject matter is included within the scope of the present invention.

What is claimed is:

1. A conveyor suitable for conveying objects along a transport direction, the conveyor comprising:
a plurality of connected links, each link having a length extending across the direction of transport and a width extending along the direction of transport, each link having a body, a slider, at least one gripping member, and a gear drive mechanism interconnecting the slider and gripping member, the slider being slidable along the length of the body to selectively move the gripping member between a first position and a second position via the gear drive mechanism, the gripping member when in first position being disposed in an open position, and the gripping member when in the second position being disposed in a gripping position for contacting one of the objects to hold the object during transport.

2. The conveyor of claim 1, wherein the gear drive mechanism is a rack and pinion arrangement with a pinion portion being located on the gripping member and a rack portion being located on the slider.

3. The conveyor of claim 1, wherein each link includes a spring member for urging the gripping member toward one of the first or second positions.

4. The conveyor of claim 1, wherein each link includes a cam follower.

5. The conveyor of claim 4, wherein the cam follower contacts a cam to thereby urge the gripper toward one of the first or second positions.

6. The conveyor of claim 1, wherein each link includes a fence member, the gripping member gripping the object between the fence member and the gripping member when the gripping member is in the second position.

7. The conveyor of claim 6, wherein the link body defines a conveying surface, and the gripping member and fence member are configured to grip the object so that the object is spaced from the conveying surface.

8. The conveyor of claim 6, wherein the gripping member and the fence member are configured to grip and convey an object in an inverted position with the object located substantially below the links.

9. The conveyor of claim 6, wherein the gripping member and the fence member are configured to grip a container neck.

10. The conveyor of claim 1, wherein the gripping member includes an adapter sized to fit the object.

11. The conveyor of claim 1, wherein the second position is self-adjustable depending on the size of the object.

12. The conveyor of claim 1, wherein each gripping member pivots relative to its respective link when moving from the first position to the second position.

13. The conveyor of claim 12, wherein each gripping member pivots about an axis substantially parallel to the direction of transport when moving from the first position to the second position.

14. The conveyor of claim 1, wherein each link includes a spring member, and each gripping member is urged toward the second position by the spring member.

15. The conveyor of claim 1, wherein the conveyor includes a first cam member for urging the gripping members toward the second position.

16. The conveyor of claim 1, wherein the conveyor includes a second cam member for urging the gripping members toward the first position.

17. The conveyor of claim 1, wherein each link includes at least one cam follower for contacting at least one cam member to move the gripping member.

18. The conveyor of claim 17, the cam follower is mounted on the slider.

19. The conveyor of claim 1, wherein the second position is self-adjustable depending on the size of the object.

20. The conveyor of claim 1, wherein the gripping member includes two gripping arms movable relative to the conveying surface.

21. The conveyor of claim 1, wherein the gripping member has at least one gripping arm laterally offset from the gear drive mechanism in the direction of transport.

22. The conveyor of claim 1, wherein the conveyor is configured so that conveyed objects can be removed from the gripping members when the gripping members are in the second gripping position.

23. The conveyor of claim 1, wherein each link includes two of the gripping members independently movable relative to the link.

24. The conveyor of claim 23, wherein each link includes two of the sliders and two of the gear drive mechanisms, each gripping member being operatively associated with a respective one of the sliders and a respective one of the gear drive mechanisms.

25. The conveyor of claim 24, wherein each gear drive mechanism includes a rack portion disposed on a respective one of the sliders and a gear portion disposed on a respective one of the gripping members.

26. A link for a conveyor suitable for conveying objects along a transport direction, the link comprising:
a link body having a length extending across the direction of transport and a width extending along the direction of transport;
a slider slidable along the length of the link body;
at least one gripping member movable relative to the slider and link body; and
a gear drive mechanism interconnecting the slider and gripping member, the slider selectively moving the gripping member between a first position and a second position via the gear drive mechanism, the gripping member when in first position being disposed in an open position, and the gripping member when in the second position being disposed in a gripping position for contacting one of the objects to hold the object during transport.

27. The link of claim 26, wherein the gear drive mechanism is a rack and pinion arrangement with a pinion portion being located on the gripping member and a rack portion being located on the slider.

28. The link of claim 26, further including a spring member for urging the gripping member toward one of the first or second positions.

29. The link of claim 26, wherein each link includes a cam follower.

30. The link of claim 29, wherein the cam follower contacts a cam to thereby urge the gripping member toward one of the first or second positions.

31. The link of claim 26, further including a fence member, the gripping member gripping the object between the fence member and the gripping member when the gripping member is in the second position.

32. The link of claim 31, wherein the link body defines a conveying surface, and the gripping member and fence member are configured to grip the object so that the object is spaced from the conveying surface.

33. The link of claim 31, wherein the gripping member and the fence member are configured to grip and convey an object in an inverted position with the object located substantially below the links.

34. The link of claim 31, wherein the gripping member and the fence member are configured to grip a container neck.

35. The link of claim 31, wherein the gripping member includes an adapter sized to fit the object.

36. The link of claim 26, wherein the second position is self-adjustable depending on the size of the object.

37. The link of claim 26, wherein each gripping member pivots relative to the link body when moving from the first position to the second position.

38. The link of claim 37, wherein each gripping member pivots about an axis substantially parallel to the direction of transport when moving from the first position to the second position.

39. The link of claim 26, further including a spring member, and each gripping member is urged toward the second position by the spring member.

40. The link of claim 26, wherein the gripping member includes two gripping arms movable relative to the conveying surface.

41. The link of claim 26, wherein the gripping member has at least one gripping arm laterally offset from the gear drive mechanism in the direction of transport.

42. The link of claim 26, wherein the link is configured so that conveyed objects can be removed from the gripping members when the gripping members are in the second gripping position.

43. The link of claim 26, wherein the link includes two of the gripping members independently movable relative to the link.

44. The link of claim 43, wherein the link includes two of the sliders and two of the gear drive mechanisms, each gripping member being operatively associated with a respective one of the sliders and a respective one of the gear drive mechanisms.

45. The link of claim 44, wherein each gear drive mechanism includes a rack portion disposed on a respective one of the sliders and a gear portion disposed on a respective one of the gripping members.

46. A link for a conveyor suitable for conveying objects along a transport direction, the link comprising:

a link body having a length extending across the direction of transport and a width extending along the direction of transport;

a slider slidable along the length of the link body;

at least one gripping member movable relative to the slider and link body, the gripping member having at least one gripping arm; and a rack and pinion gear drive mechanism interconnecting the slider and gripping member, the gripping arm being laterally offset from the gear drive mechanism in the direction of transport, a pinion portion being located on the gripping member and a rack portion being located on the slider, the slider selectively moving the gripping member between a first position and a second position via the gear drive mechanism, the gripping member when in first position being disposed in an open position, and the gripping member when in the second position being disposed in a gripping position for contacting one of the objects to hold the object during transport.

47. The link of claim 46, further including a spring member for urging the gripping member toward one of the first or second positions.

48. The link of claim 46, wherein each link includes a cam follower.

49. The link of claim 48, wherein the cam follower contacts a cam to thereby urge the gripping member toward one of the first or second positions.

50. The link of claim 46, further including a fence member, the gripping member gripping the object between the fence member and the gripping member when the gripping member is in the second position.

51. The link of claim 50, wherein the link body defines a conveying surface, and the gripping member and fence member are configured to grip the object so that the object is spaced from the conveying surface.

52. The link of claim 50, wherein the gripping member and the fence member are configured to grip and convey an object in an inverted position with the object located substantially below the links.

53. The link of claim 50, wherein the gripping member and the fence member are configured to grip a container neck.

54. The link of claim 46, wherein the gripping member includes an adapter sized to fit the object.

55. The link of claim 46, wherein the second position is self-adjustable depending on the size of the object.

56. The link of claim 46, wherein each gripping member pivots relative to the link body when moving from the first position to the second position.

57. The link of claim 56, wherein each gripping member pivots about an axis substantially parallel to the direction of transport when moving from the first position to the second position.

58. The link of claim 46, wherein the gripping member includes two gripping arms movable relative to the conveying surface.

59. The link of claim 58, wherein both of the gripping arms are laterally offset from the gear drive mechanism in the direction of transport.

60. The link of claim 46, wherein the link is configured so that conveyed objects can be removed from the gripping members when the gripping members are in the second gripping position.

61. The link of claim 46, wherein the link includes two of the gripping members independently movable relative to the link.

62. The link of claim 61, wherein the link includes two of the sliders and two of the gear drive mechanisms, each gripping member being operatively associated with a respective one of the sliders and a respective one of the gear drive mechanisms.

* * * * *

UNITED STATES PATENT AND TRADEMARK OFFICE
CERTIFICATE OF CORRECTION

PATENT NO. : 7,021,453 B2  
APPLICATION NO. : 10/712405  
DATED : April 4, 2006  
INVENTOR(S) : Hartness et al.

It is certified that error appears in the above-identified patent and that said Letters Patent is hereby corrected as shown below:

On the title page: Item [56]

U.S. PATENT DOCUMENTS
 "4,745,007 A  5/1998 Houseman" should read --4,746,007 A  5/1988 Houseman--

Signed and Sealed this

Seventh Day of August, 2007

JON W. DUDAS
*Director of the United States Patent and Trademark Office*